(12) United States Patent
Ko et al.

(10) Patent No.: US 12,517,109 B2
(45) Date of Patent: Jan. 6, 2026

(54) SAMPLE-TESTING SYSTEM FOR MEASURING PROPERTIES OF RED BLOOD CELLS

(71) Applicant: ORANGE BIOMED LTD., CO, Seoul (KR)

(72) Inventors: Ung Hyeon Ko, Seoul (KR); Eun Young Park, Seoul (KR); Seung Jin Kang, Seoul (KR)

(73) Assignee: ORANGE BIOMED LTD., CO., Seoul (KR)

( * ) Notice: Subject to any disclaimer, the term of this patent is extended or adjusted under 35 U.S.C. 154(b) by 0 days.

(21) Appl. No.: 18/534,014

(22) Filed: Dec. 8, 2023

(65) Prior Publication Data

US 2024/0192193 A1 Jun. 13, 2024

Related U.S. Application Data

(60) Provisional application No. 63/386,887, filed on Dec. 9, 2022.

(51) Int. Cl.
*G01N 33/49* (2006.01)
*A61B 5/02* (2006.01)
*A61B 5/026* (2006.01)

(52) U.S. Cl.
CPC ............ *G01N 33/4915* (2013.01); *A61B 5/02* (2013.01); *A61B 5/026* (2013.01)

(58) Field of Classification Search
CPC ............... G01N 33/49; G01N 33/4915; G01N 15/1023; G01N 15/1031; G01N 2015/012; G01N 2015/1006; G01N 2015/1024; G01N 2015/1027; G01N 2015/1029; G01N 33/48707; G01N 27/02; G01N 27/327; G01N 33/72; G01N 33/723; G01N 33/726; G01N 33/80; B01L 2200/027; B01L 2200/10; B01L 2200/14; B01L 2300/0645;
(Continued)

(56) References Cited

U.S. PATENT DOCUMENTS 5,206,144 A 4/1993 Zeuthen et al.
5,642,734 A 7/1997 Ruben et al.
(Continued)

FOREIGN PATENT DOCUMENTS

EP 1162449 A1 12/2001
EP 2047909 A2 4/2009
(Continued)

OTHER PUBLICATIONS

Ko, KR102439474B1 "Method and device for determining HbA1c levels using mechanical and electrical characteristics of RBCs" Google Translation (Year: 2024).*
(Continued)

*Primary Examiner* — Dean Kwak
(74) *Attorney, Agent, or Firm* — Perkins Coie LLP

(57) ABSTRACT

The present disclosure relates to systems, devices and methods for measuring analyte levels. A glycated hemoglobin level measuring system includes a sample-testing cartridge having a microchannel that passively transfers and compresses cells. The system can perform one or more calibration or normalization routines on sensor data to generate calibrated or normalized data. The calibrated or normalized data can be used to determine one or more analyte levels.

11 Claims, 23 Drawing Sheets

(58) Field of Classification Search
CPC ....... B01L 2300/0816; B01L 2300/087; B01L 2400/0403; B01L 3/00; B01L 3/502715; A61B 5/02; A61B 5/026
See application file for complete search history.

(56) References Cited

U.S. PATENT DOCUMENTS

| | | |
|---|---|---|
| 6,204,668 B1 | 3/2001 | Sequeira et al. |
| 6,399,293 B1 | 6/2002 | Pachl et al. |
| 6,949,070 B2 | 9/2005 | Ishler |
| 8,252,163 B2 | 8/2012 | Sugiyama et al. |
| 8,759,095 B2 | 6/2014 | Vink |
| 8,789,405 B2 | 7/2014 | Sugiyama |
| 9,017,536 B2 | 4/2015 | Oishi et al. |
| 9,080,939 B2 | 7/2015 | Tsai et al. |
| 9,429,579 B2 | 8/2016 | Sugiyama et al. |
| 9,795,328 B2 | 10/2017 | Taub et al. |
| 9,977,037 B2 | 5/2018 | Yoshida et al. |
| 10,641,724 B2 | 5/2020 | Ainger et al. |
| 10,996,187 B2 | 5/2021 | Lee et al. |
| 11,009,479 B2 | 5/2021 | Liu et al. |
| 11,111,517 B2 | 9/2021 | Ichiyanagi et al. |
| 11,376,590 B2 | 7/2022 | Gurkan et al. |
| 11,385,244 B2 | 7/2022 | Shigemitsu et al. |
| 11,400,452 B2 | 8/2022 | Jagtiani |
| 11,747,348 B2 | 9/2023 | Ko |
| 11,852,577 B2 | 12/2023 | Ko |
| 12,019,082 B2 | 6/2024 | Ko |
| 12,025,548 B2 | 7/2024 | Ko |
| 2005/0014249 A1 | 1/2005 | Staimer |
| 2006/0184037 A1 | 8/2006 | Ince |
| 2006/0244964 A1 | 11/2006 | Cox |
| 2007/0195127 A1* | 8/2007 | Ahn .................. G01N 15/1404 347/55 |
| 2007/0267361 A1 | 11/2007 | Tyvoll |
| 2010/0089774 A1 | 4/2010 | Manohar et al. |
| 2010/0145174 A1 | 6/2010 | Alferness et al. |
| 2010/0178660 A1 | 7/2010 | Adamczyk et al. |
| 2012/0148805 A1 | 6/2012 | Goad |
| 2015/0268244 A1 | 9/2015 | Cho et al. |
| 2017/0227495 A1 | 8/2017 | Gurkan |
| 2018/0235524 A1 | 8/2018 | Dunn et al. |
| 2018/0364186 A1 | 12/2018 | Watkins et al. |
| 2019/0107533 A1 | 4/2019 | Nagi |
| 2019/0232287 A1 | 8/2019 | Depa et al. |
| 2020/0101456 A1 | 4/2020 | Watkins et al. |
| 2020/0200734 A1 | 6/2020 | Yu et al. |
| 2021/0025904 A1 | 1/2021 | Snodgrass et al. |
| 2021/0072137 A1 | 3/2021 | Michel et al. |
| 2021/0229102 A1 | 7/2021 | Jagtiani |
| 2021/0239717 A1 | 8/2021 | Clarke et al. |
| 2021/0293693 A1 | 9/2021 | Bharadwaj et al. |
| 2022/0065876 A1 | 3/2022 | Connolly |
| 2022/0097080 A1 | 3/2022 | Weber |
| 2022/0120768 A1 | 4/2022 | Nishiyama |
| 2022/0134339 A1 | 5/2022 | Hayashino et al. |
| 2022/0176378 A1 | 6/2022 | Jagtiani |
| 2022/0187184 A1 | 6/2022 | Al et al. |
| 2022/0362779 A1 | 11/2022 | Jagtiani |

FOREIGN PATENT DOCUMENTS

| | | | |
|---|---|---|---|
| EP | 2182345 B1 | 6/2013 | |
| EP | 2568281 B1 | 11/2018 | |
| EP | 2144057 B1 | 4/2019 | |
| EP | 2995947 B1 | 1/2020 | |
| JP | 2002538459 A | 11/2002 | |
| JP | H08292193 A | 10/2003 | |
| JP | 2012529033 A | 11/2012 | |
| JP | 2017521679 A | 8/2017 | |
| KR | 20030008223 A * | 1/2003 | ............ G01N 11/00 |
| KR | 20050120637 A | 12/2005 | |
| KR | 20070061042 A | 6/2007 | |
| KR | 20120111878 A | 10/2012 | |
| KR | 20130066841 A | 6/2013 | |
| KR | 20150108050 A * | 9/2015 | ............ C12M 1/34 |
| KR | 20150126476 A | 11/2015 | |
| KR | 101584083 B1 | 1/2016 | |
| KR | 101666847 B1 | 10/2016 | |
| KR | 20160014142 A | 10/2016 | |
| KR | 101681170 B1 | 12/2016 | |
| KR | 101802289 B1 | 12/2017 | |
| KR | 101818368 B1 | 1/2018 | |
| KR | 101884314 B1 | 8/2018 | |
| KR | 101885964 B1 | 8/2018 | |
| KR | 101995253 B1 | 7/2019 | |
| KR | 10-2020-0006695 A | 1/2020 | |
| KR | 102104654 B1 | 4/2020 | |
| KR | 20200097068 A | 8/2020 | |
| KR | 102174557 B1 | 11/2020 | |
| KR | 102281500 B1 | 7/2021 | |
| KR | 102315843 B1 | 10/2021 | |
| KR | 102403577 B1 | 5/2022 | |
| KR | 102439240 B1 | 9/2022 | |
| KR | 102439474 B1 * | 9/2022 | ......... G01N 27/3271 |
| WO | 2010137470 A1 | 12/2010 | |
| WO | 2013153406 A1 | 10/2013 | |

OTHER PUBLICATIONS

Han et al., KR20150108050A "Apparatus for measuring cell deformability" Google Translation (Year: 2024).*

Hardeman et al., Laser-Assisted Optical Rotational Cell Analyser (L.O.R.C.A.); I. A New Instrument for Measurement of Various Structural Hemorheological Parameters, Clinical Hemorheology, vol. 14, No. 4, pp. 605-618, 1994 (Year: 1994).*

Shin, S. KR20030008223A "Vacuum Viscometer" Google Translation (Year: 2024).*

International Search Report and Written Opinion mailed Mar. 17, 2023 for PCT Application No. PCT/KR2022/019905; 6 pages.

International Search Report mailed on Jul. 11, 2022 for International Patent Application No. PCT/KR2021/018280, 3 pages.

Tsai, et al., "Impedance measurement system for automatic determination of glycated hemoglobin", Rev. Sci. Instrum. 89, 065003, https://doi.org/10.1063/1.5025151, Jun. 28, 2018, 10 pages.

Makris, Konstantinos, and Loukia Spanou, "Is there a relationship between mean blood glucose and glycated hemoglobin?" Journal of diabetes science and technology 5.6 (2011); 1572-1583. (Year 2011).

International Search Report and Written Opinion issued by Korean Intellectual Property Office for PCT/IB2023/062425 on Mar. 22, 2024, 10 pages.

Wu, Tenghu, and James J. Feng. "Simulation of malaria-infected red blood cells in microfluidic channels: Passage and blockage." Biomicrofluidics 7.4 (2013). (Year: 2013).

* cited by examiner

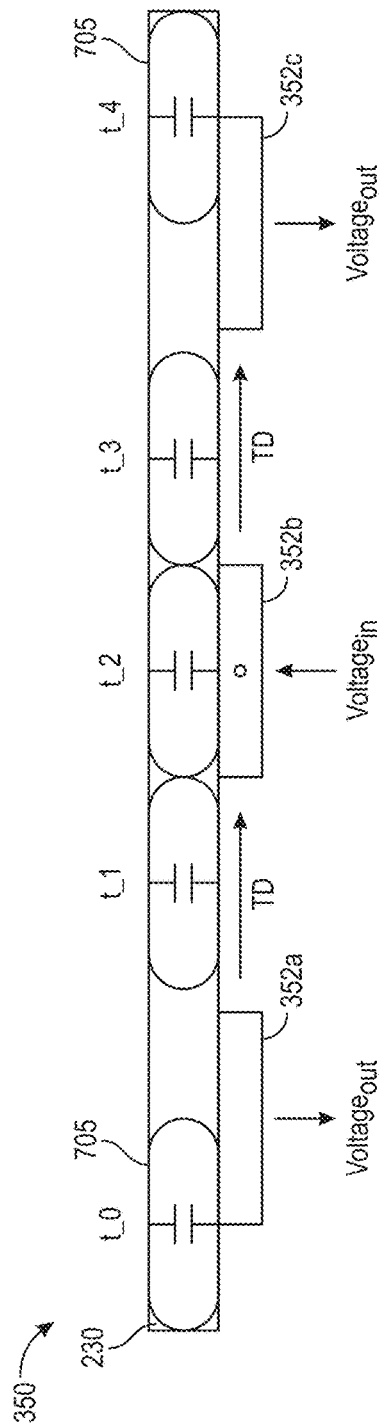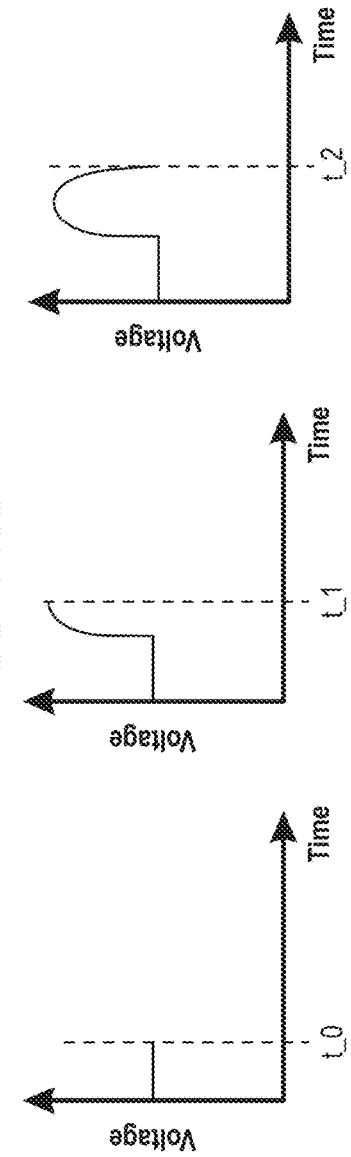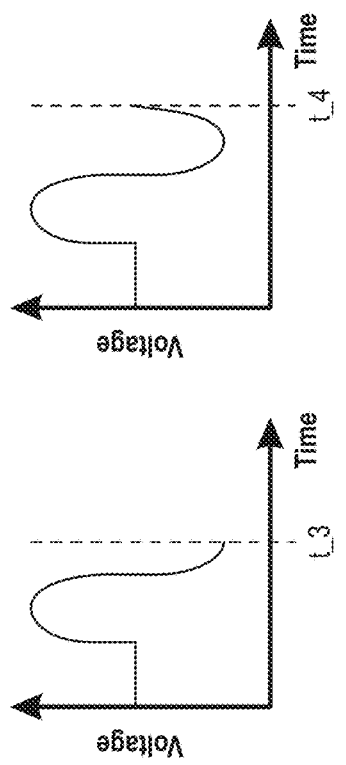
FIG. 7A
FIG. 7B

SAMPLE-TESTING SYSTEM FOR MEASURING PROPERTIES OF RED BLOOD CELLS

CROSS-REFERENCE TO RELATED APPLICATION

The present application claims the benefit of U.S. Provisional Patent Application No. 63/386,887, filed Dec. 9, 2022, the entirety of which is incorporated herein by reference.

TECHNICAL FIELD

This present disclosure relates to analyte detection and sample-testing systems configured to measure one or more characteristics associated with analytes, such as glycated A1c hemoglobin.

BACKGROUND

A blood sugar test, which is generally performed to diagnose diabetes, measures the level of glucose in the blood and yields a blood sugar level. However, the blood sugar level is a temporary value and may change before or after meals, or according to other factors.

By contrast, a glycated hemoglobin test measures the level of glucose linked or combined within the hemoglobin residing in red blood cells. While the red blood cells are in blood, they are able to bind with glucose within the blood. By measuring or estimating an average amount of glucose that has been attached to hemoglobin over time, the glycated hemoglobin test can measure the glucose level accumulated over the average lifespan of a red blood cell (e.g., three months). Therefore, the glycated hemoglobin test is less affected by physical activities or food intake than other blood sugar tests. That is, the glycated hemoglobin level is more stable than the blood sugar level and may be a better reference for diagnosing diabetes.

However, conventional glycated hemoglobin level measuring devices require complex technology and equipment that have limited accessibilities (e.g., only accessible to hospitals and laboratory levels of institutions). While continuous management of glycated hemoglobin level is required to manage diabetes and its prognosis, patients have very few options for tracking such management. Moreover, efforts to develop such accessible management methods are only recently being developed. Like blood sugar measurement devices that have been popularized for home use, efforts are being made to enable measurement of glycated hemoglobin level at home without visiting a clinic (see, e.g., Korean Patent Registration Publication KR2281500 (registration date: Jul. 20, 2021)). However, such efforts focus on biochemical methods that have several disadvantages, including lifespan limitations for required components, difficult storage methods, and low or unreliable measurement accuracy attributable to poor storage conditions or the skills of the user.

BRIEF DESCRIPTION OF THE DRAWINGS

Features, aspects, and advantages of the presently disclosed technology may be better understood with regard to the following drawings.

FIGS. 7A and 7B illustrate steps for measuring an analyte in accordance with some embodiments of the present technology.

Figure 1:
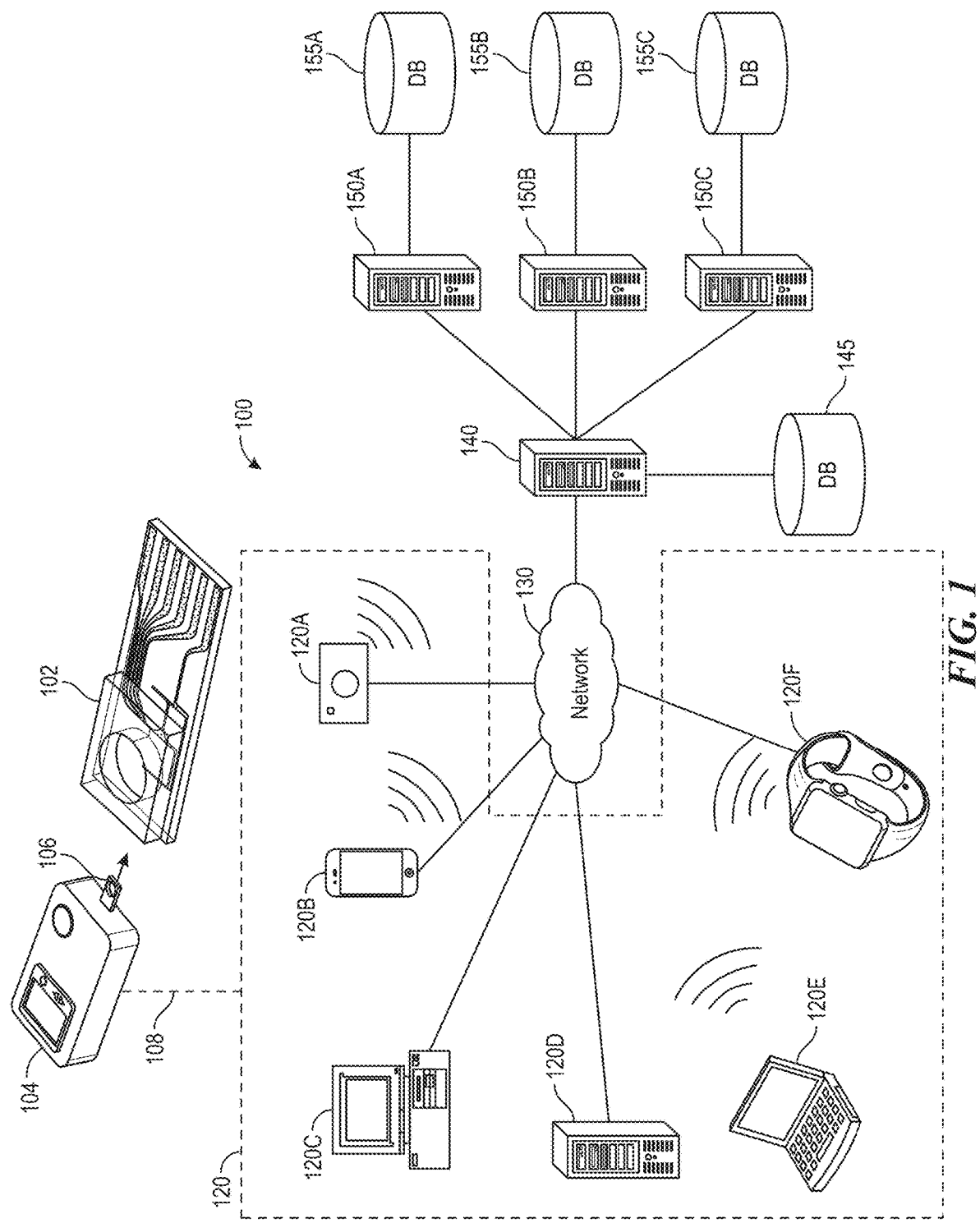
FIG. 1 is a block diagram illustrating an environment in which some embodiments of analyte level measuring systems can operate.

A person skilled in the relevant art will understand that the features shown in the drawings are for purposes of illustrations, and variations, including different and/or additional features and arrangements thereof, are possible.

DETAILED DESCRIPTION

Introduction

The following disclosure describes systems, devices, and methods for measuring analyte levels. More specifically, the present technology relates to a device that leverages microchannel manufacturing technology to measure an analyte level, such as glycated hemoglobin level or analyte levels, at home. More specifically, one or more embodiments of the present technology include measuring a glycated hemoglobin level based on one or more physical characteristics of a sample (e.g., finger-blood samples or other sampling techniques). For example, the glycated hemoglobin level can be determined based on measured change(s) in one or more physical characteristics (e.g., mechanical characteristics, deformability, stiffness, etc.) of a glycated red blood cell. The system can include a pumpless cartridge with a particle analyze-sensor that uses capillary action for cell movement. The system can perform one or more routines (e.g., calibration routines, normalization routines) to, for example, operate the sensor, increase analyte detection accuracy, process collected data, or the like.

In some embodiments, a glycated hemoglobin level measuring system includes a sample-testing cartridge having a microchannel that compresses cells. The system can perform one or more calibration routines using sensor data to generate processing outputs (e.g., calibrated data). The calibrated data can be used to determine one or more analyte levels. Alternatively or additionally, the system can perform one or more normalization routines using sensor data to generate the processing outputs (e.g., normalized data).

For illustrative purposes, the present technology is described with respect to measuring one or more aspects related to glycation of red blood cells. However, it is understood that the present technology can be used to measure or analyze other fluid-suspended particulates and/or characteristics thereof.

Operating Environment

FIG. 1 is a block diagram illustrating an environment 100 in which some embodiments of an analyte level measuring system can operate. The analyte level measuring system can be an analyte measuring system (e.g., a glycated hemoglobin level measuring system), and can include a sample-testing device or cartridge 102 ("cartridge 102"), and an analysis apparatus 104 couplable to the cartridge 102 (e.g., via a connector 106). The cartridge 102 can interrogate the sample based on received input. In some embodiments, the cartridge 102 can include an inlet configured to receive a blood sample (e.g., a diluted blood sample), and an outlet configured to release the blood sample. The inlet may be larger in width and/or depth than the outlet for easier entry of the blood sample. The analyte level measuring system can perform one or more calibration and/or normalization routines (e.g., sensor calibration routines, electrode calibration routines, data normalization routines), signal processing parameters (e.g., calibration parameters), and other routines to adjust performance. Example features of the cartridge 102 are discussed in connection with FIGS. 2-6B.

The analysis apparatus 104 can communicate, via a direct wired or wireless communication link 108 and/or a network 130, with one or more client computing devices 120, examples of which include an imaging device 120A, a smart phone or tablet 120B, a desktop computer 120C, a computer system 120D, a laptop computer 120E, and a wearable device 120F. These are only examples of some of the devices, and other embodiments can include other computing devices, such as other types of personal and/or mobile computing devices. Client computing devices 120 can collect various data from a user (e.g., analyte data from a wearable analyte monitor (for example, a continuous glucose monitor (CGM)), sleep data, heart rate data, blood pressure data, dietary information, exercise data, health metrics, etc.) and communicate the collected data to the analysis apparatus 104 and/or a service provider (e.g., a remote device/system, such as a server). The collected data can be leveraged for the testing/measuring processes. For example, the analysis apparatus 104 can include a processing system programmed to provide output based on correlates between real-time CGM data and glycated A1c hemoglobin levels. For example, the processing system can include a controller with one or more processors, memory storing programs for calibration and/or analyzing the collected data executable to, for example, identify individual cells, overlapping of cells, speed of travel of cells, flow rate of samples, etc. Example calibration routines are discussed in connection with FIGS. 9-13. The analysis apparatus 104 can perform one or more sensor calibration routines, adjusting signal processing parameters (e.g., thresholding values, filtering parameters, calibration parameters, etc.), testing settings, routines, and/or algorithms based on the collected data. The analysis apparatus 104 can transmit data (e.g., raw data, processed data, sensor signals, etc.) to a remote device and receive data (e.g., calibration parameters, signal processing parameters, algorithms, firmware updates) from a remote device.

The client computing devices 120 can also communicate information, such as test results or other notifications, from the analysis apparatus 104 and/or the service provider to the user. Accordingly, the computing devices 120 can operate in a networked environment using logical connections through the network 130 to the analysis apparatus 104 and/or one or more remote computers, such as a server computing device or a cloud computing environment. The networked environment can also be used to provide software updates to algorithms used in the analysis apparatus 104 and/or the one or more client computing devices 120.

In some embodiments, the analysis can be performed or shared with a backend system (e.g., one or more computing devices, such as servers, and/or data bases configured to perform the analysis of the collected data). For example, the computing environment can include one or more computing devices (e.g., servers 140 and/or 150A-C, databases 155A-C, or the like) communicatively coupled to the client computing devices 120 and/or the analysis apparatus 104. For the illustrated example, the server 140 can be an edge server which receives client requests and coordinates fulfillment of those requests through other servers, such as servers 150A-C. Server computing devices 140 and 150 can include computing systems. Though each server computing device 140 and 150 is displayed logically as a single server, server computing devices can each be a distributed computing environment encompassing multiple computing devices located at the same or at geographically disparate physical locations. In some implementations, each server 150 corresponds to a group of servers.

Client computing devices 120 and server computing devices 140 and 150 can each act as a server or client to other server/client devices. Server 140 can connect to a database 145. For example, the servers 150A-C can each connect to a corresponding database 155A-C. As discussed above, each server 150 can correspond to a group of servers, and each of these servers can share a database or can have their own database. Databases 145 and 155 can warehouse (e.g., store) information. Though databases 145 and 155 are displayed logically as single units, databases 145 and 155 can each be a distributed computing environment encompassing multiple computing devices, can be located within their corresponding server, or can be located at the same or at geographically disparate physical locations.

Network 130 can be a local area network (LAN), a wide area network (WAN), and/or other wired, wireless, or combinational networks. Portions of network 130 may be the Internet or some other public or private network. Client computing devices 120 can be connected to network 130 through a network interface, such as by wired or wireless communication. While the connections between server 140 and servers 150 are shown as separate connections, these connections can be any kind of local, wide area, wired, or wireless network, including network 130 or a separate public or private network.

In some embodiments, the analysis apparatus 104 can initiate one or more tests for the blood sample collected at the cartridge 102. The analysis apparatus 104 can interact with the cartridge 102 to collect and analyze one or more measurements regarding the blood sample. The analysis apparatus 104 can communicate the analysis results to the server 140 corresponding to other entities, such as a healthcare provider, a further health tracking or comprehensive health analysis service, or the like. Alternatively, the analysis apparatus 104 can provide the measurements to the server 140 (e.g., without local analysis at the analysis apparatus 104), and the remote service provider can analyze the provided measurements.

Sample-Testing Cartridges

Figure 2:
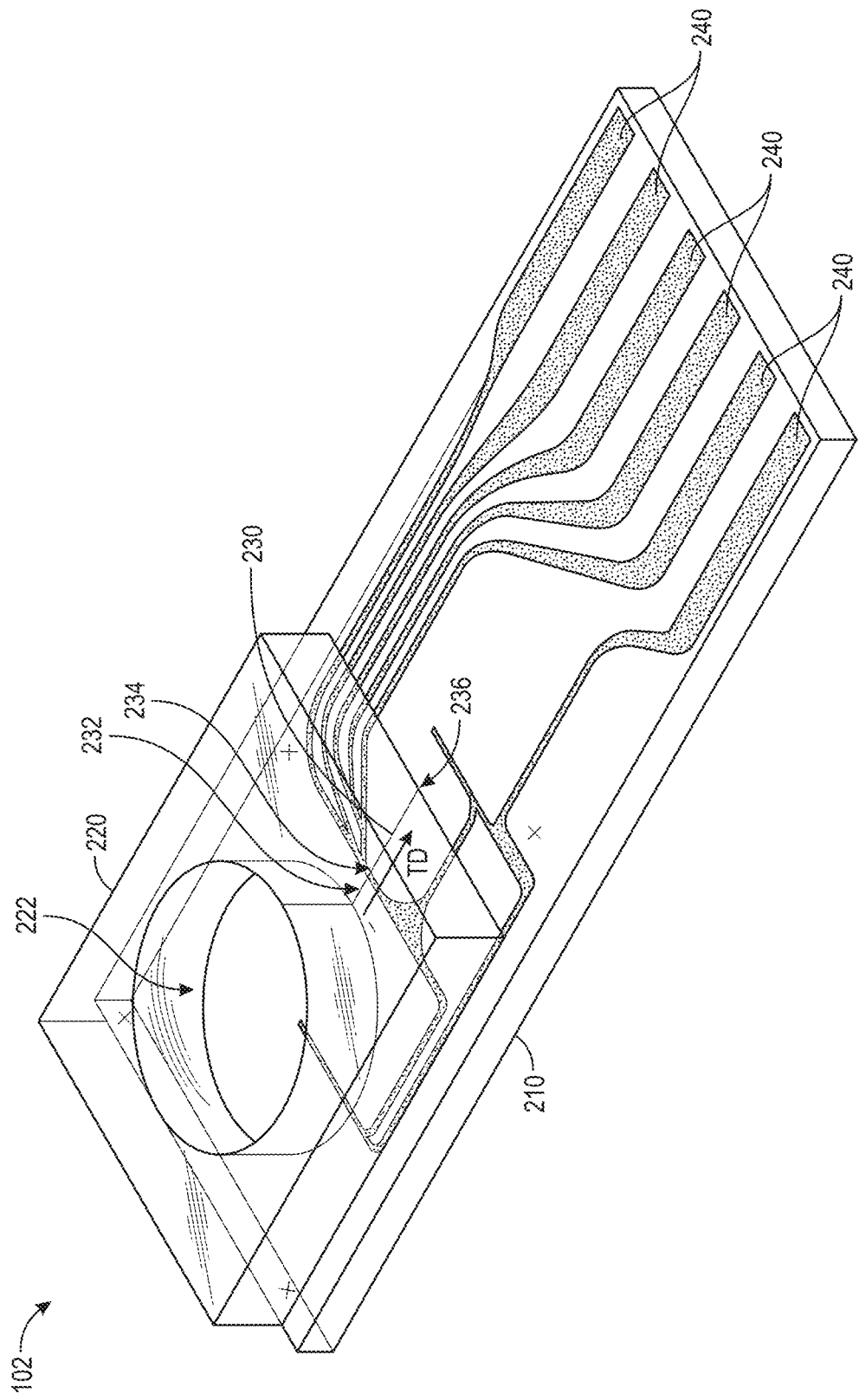
FIG. 2 is a partially transparent isomeric view of a sample-testing cartridge in accordance with some embodiments of the present technology.

FIGS. 2-6B illustrate various embodiments of sample-testing cartridges according to some embodiments of the present technology. FIG. 2 is a partially transparent isometric view of the cartridge 102 in accordance with some embodiments of the present technology. The cartridge 102 can include a plate-shaped chip or substrate 210 and a sensor body 220 disposed thereon. The substrate 210 and/or the sensor body 220 can be made from elastomers (e.g., polydimethylsiloxane (PDMS)), glass (e.g., borate glass, soda-lime glass), or other suitable materials. The sensor body 220 can define an opening or cavity 222 into which a user can deposit a sample (e.g., a drop of blood). A microchannel or other microfluidic pattern 230 ("the microchannel 230") extending from the cavity 222 can be formed on the substrate 210 and/or the sensor body 220. In some embodiments, electrodes 240 (also referred to as a blood cell analyzer) are patterned onto the substrate 210 (e.g., onto a top surface of the substrate 210) by photolithography, chemical vapor deposition, and/or other techniques such that the electrodes 240 are positioned adjacent to the microchannel 230.

In some embodiments, prior to attachment to the substrate 210, the sensor body 220 (e.g., liquid PDMS) is applied onto a patterned wafer and cured (e.g., at 70-150° C. for 1-4 hours). The patterned wafer and the curing process can be used to create specific patterns (e.g., the microchannel 230, a microchannel entrance, a microchannel exit) the sensor body 220 (e.g., onto a bottom surface of the sensor body 220) using a biopsy punch and/or other tools. In some embodiments, the microchannel 230 is formed by lithography (e.g., soft lithography, photolithography). The patterned sensor body 220 can then be attached to the substrate 210 such that, for example, the microchannel 230 on the sensor body 220 aligns properly with the electrodes 240 on the substrate 210.

In some embodiments, the substrate 210, which may include the electrodes 240, is further patterned to include the microchannel 230. For example, the substrate 210 can be made from glass and the microchannel 230 can be formed via polyimide patterning. The sensor body 220 (e.g., without any patterning) can then be disposed over the substrate 210. Manufacturing the cartridge 102 in this manner can be advantageous because by patterning both the microchannel 230 and the electrodes 240 on the substrate, the microchannel 230 and the electrodes 240 can be pre-aligned on the substrate 210 when the substrate 210 and the sensor body 220 are attached. In contrast, forming the electrodes 240 on the substrate 210 and forming the microchannel 230 separately on the sensor body 220 may require precise alignment of the substrate 210 and the sensor body 220, which can be difficult with conventional manufacturing techniques.

In the illustrated embodiment, the microchannel 230 extends from the cavity 222 to an edge of the sensor body 220 in a generally linear direction. In particular, the microchannel 230 has an inlet region 232 fluidly connected to the cavity 222, an outlet region 236 fluidly connected to the environment and/or a collection pool (not shown), and an observation window 234 extending therebetween. Red blood cells (or other particulates) in the sample received in the cavity 222 can travel along the microchannel 230 in travel direction TD, moving across the inlet region 232, the observation window 234, and out through the outlet region 236. Details of the microchannel 230 and the electrodes 240 are described in further detail below with respect to FIGS. 3-6B.

In some embodiments, the cartridge 102 is reusable or disposable. As used herein, the term "disposable" when applied to a system or component (or combination of components), such as a cartridge or sensor, is a broad term and means, without limitation, that the component in question is used a finite number of times and then discarded. Some disposable single-use components are used only once and then inoperable. Other disposable components are used more than once and then discarded. For example, a disposable single-sample cartridge can be used to analyze a single sample and then discarded. The system or cartridge prevents multi-sample usage by destroying or preventing operation of components after analysis of the single sample. In other embodiments, the system can be programmed to identify a disposable cartridge and then authorizes usage of the cartridge for limited uses (e.g., a number of samples that can be analyzed).

Figure 3:
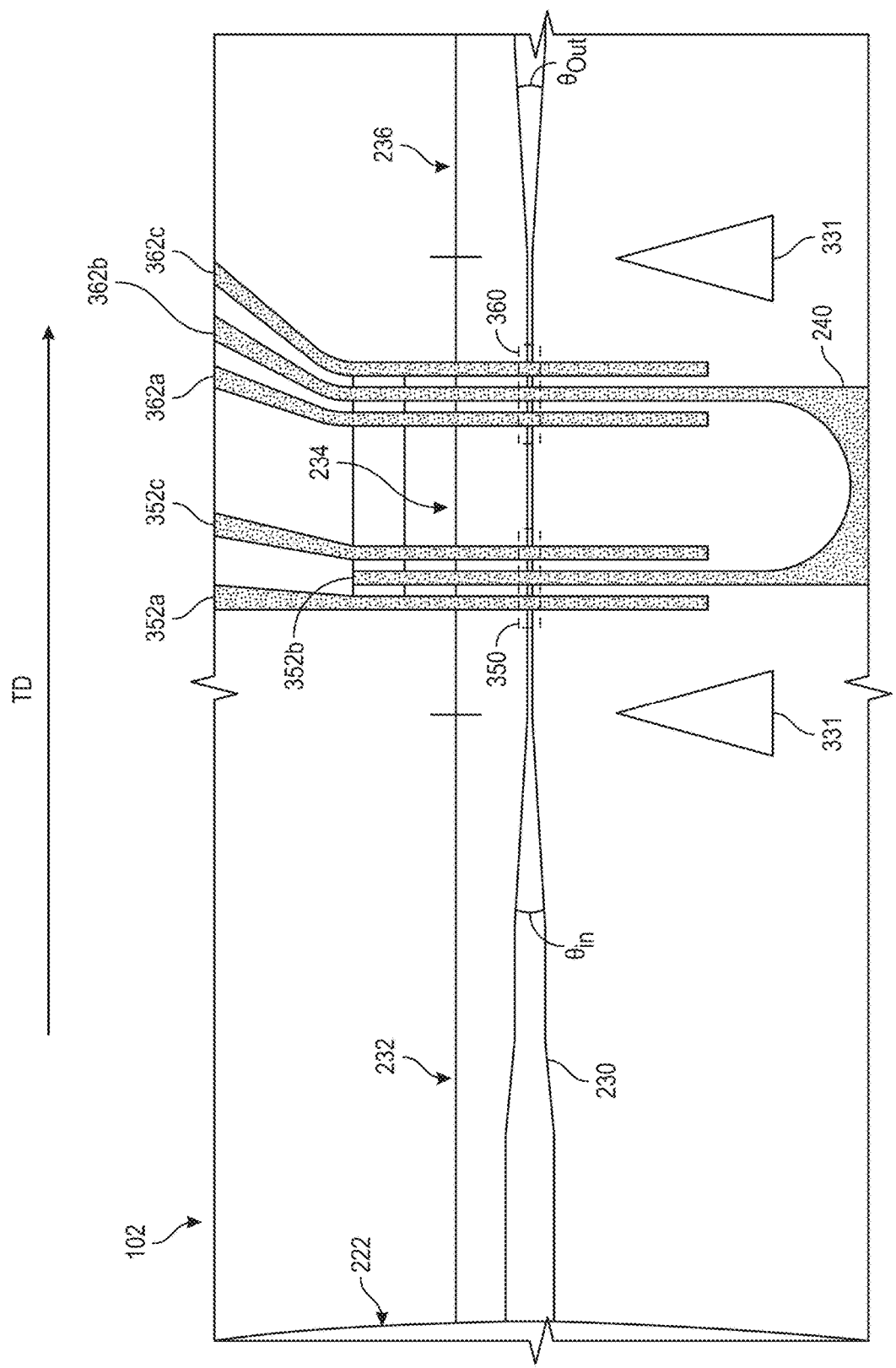
FIG. 3 is a plan view of a portion of the sample-testing cartridge of FIG. 2.

FIG. 3 is a plan view of a portion of the cartridge 102, such as for illustrating the microchannel 230 and the corresponding sensor mechanism. The boundaries between the inlet region 232, the observation window 234, and the outlet region 236 of the microchannel 230 are generally indicated by markers 331 on the cartridge 102. As shown, the inlet region 232 of the microchannel 230 can be formed to narrow in the travel direction TD by an average angle $\theta_{in}$ and the outlet region 236 of the microchannel 230 can be formed to widen in the travel direction TD by an average angle $\theta_{out}$. In some embodiments, the angles $\theta_{in}$ and/or $\theta_{out}$ can be 1 degree, 2 degrees, 3 degrees, 4 degrees, 5 degrees, 6 degrees, 7 degrees, 8 degrees, 9 degrees, 10 degrees, or more. In some embodiments, the flow of the sample (e.g., blood containing red blood cells) through the microchannel 230 is initiated by capillary action. In some embodiments, materials for the microchannel 230 can be selected for their hydrophilicity to initiate and control flow velocity through the microchannel 230. For example, the materials forming the walls of the microchannel 230 can be glass (e.g., soda-lime glass), which can exhibit a 48-49° contact angle, PDMS (e.g., with DBE-712, as DBE chemicals can be added to create a hydrophilic surface with PDMS, which is hydrophobic), which can exhibit an 85-86° contact angle. The surface finish and composition of the surfaces can be selected based on the target contact angle, hydrophobic/hydrophilic surface characteristics, capillary action, frictional interaction, etc. In some embodiments, the user can add liquid (e.g., water, saline, etc.) to the sample (e.g., in the cavity 222) to further facilitate fluid flow through the microchannel 230. Additionally or alternatively, the microchannel 230 can be fluidically coupled to a pump that is configured to control pressure before, in, and/or after the microchannel 230, thereby facilitating the movement of the sample through the microchannel 230.

In some embodiments, once the microchannel 230 is generally full of sample flow therethrough, the sample reaching the end of the microchannel 230 (e.g., the edge of the sensor body 220 illustrated in FIG. 2) can enter a collection pool and/or evaporate to allow the flow to continue. The outlet region 236 can have a predetermined geometry (e.g., cross-sectional dimension at the edge of the sensor body 220) to affect the evaporation rate and thus the flow velocity. The evaporation rate can also be affected by other factors such as the fluidic properties of the sample and ambient pressure. The evaporation rate may be calculated by:

$$Q_{evap} = \bar{k}_c A_s \frac{M}{R_u}\left(\frac{P_s}{T_s} - H\frac{P_\infty}{T_\infty}\right)$$

where, $Q_{evap}$ is the evaporation rate, $k_c$ is the mass transfer coefficient, $A_s$ is the evaporation surface area, M is the molecular mass of the sample solution, $P_s$ is the saturated pressure, $T_s$ is the saturated temperature, $P_\infty$ is the ambient pressure, and $T_\infty$ is the ambient temperature. When leveraging capillary action through the microchannel 230 and evaporation at the outlet, the cartridge 102 can passively facilitate sample flow without the use of pumps or other mechanisms to drive the sample through the microchannel 230.

In the illustrated embodiment, six strips (or portions of) the electrodes 240 extend across or are positioned adjacent to the observation window 234 of the microchannel 230. A first set (e.g., three strips) of the electrodes 240 (individually labeled 352a, 352b, 352c) can define a first region 350 along the microchannel 230 and a second set (e.g., three different strips) of the electrodes 240 (individually labeled 362a, 362b, 362c) can define a second region 360 along the microchannel 230. While both the first and second regions 350, 360 are within the observation window 234, the first region 350 is positioned closer to the inlet region 232 than the second region 360 is, and conversely, the second region 360 is positioned closer to the outlet region 236 than the first region 350 is. Accordingly, a sample traversing through the microchannel 230 can enter the first region 350 and then the second region 360 before reaching the outlet region 236.

Figure 4A:
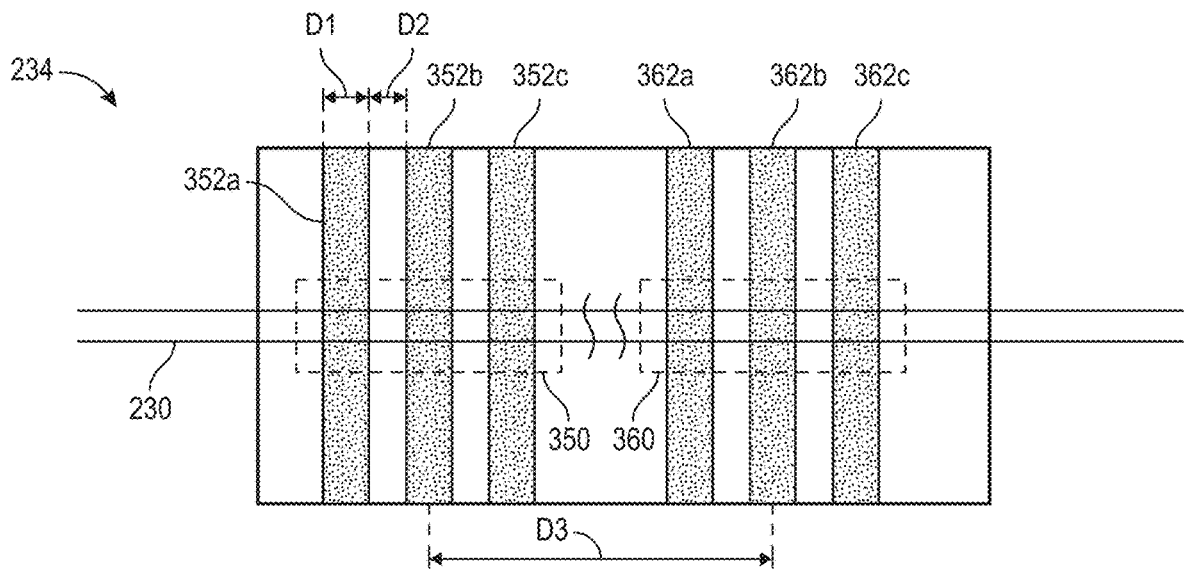
FIGS. 4A-4C illustrate various features associated with the sample-testing cartridge of FIG. 2 in accordance with some embodiments of the present technology.
Figure 4B:
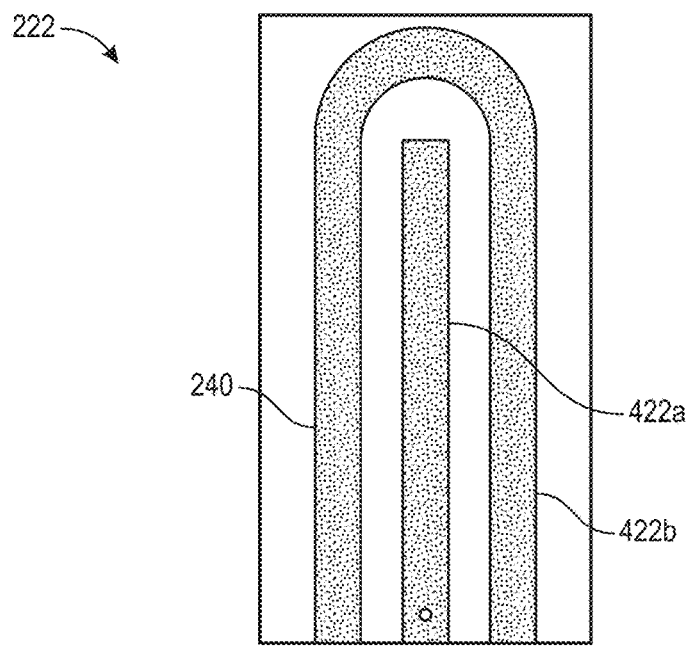
Figure 4C:
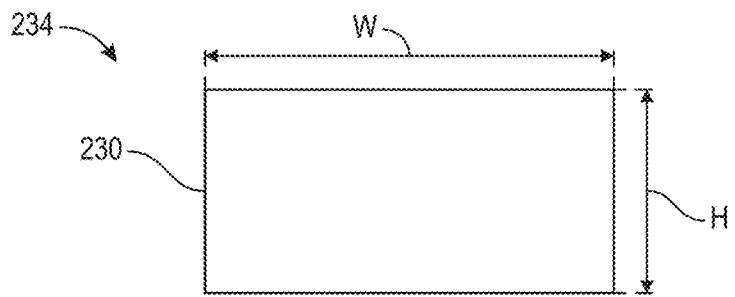

FIGS. 4A-4C illustrate various features associated with the cartridge 102 in accordance with some embodiments of the present technology. Referring first to FIG. 4A, which shows a plan view of the observation window 234, each electrode strip (e.g., strips 352a, 352b, 352c, 362a, 362b, 362c) can have a thickness D1 adjacent the microchannel 230. For example, the thickness D1 can be 10 µm, 15 µm, 20 µm, any value therebetween, or other values. In some embodiments, the thickness D1 of each electrode strip can be selected based on the desired analysis. For example, a relatively thin electrode strip (e.g., D1 equal to about 10 µm) can result in signals with narrow peaks and/or troughs (e.g., see example signal difference readings in FIG. 7B), while a relatively thick electrode strip (e.g., D1 equal to about signal measurements can be 20 µm) can result in signals with wider peaks, troughs, midpoints, and/or other parts of the signal. Additionally, the signals resulting from the thicker/wider electrode can have (wider) flat (e.g., horizontal) portions within the peaks, troughs, and or transitions between peaks/troughs. Therefore, the thickness D1 can be selected based on the type of signal measurements targeted for the analysis. For example, narrower or thinner electrodes may be used when using signal peaks to compute the glycation levels.

Each adjacent pair of electrode strips within the same region (e.g., the first region 350, the second region 360) can be separated by a gap D2 adjacent the microchannel 230. Example dimensions of the gap D2 can include 10 µm, 15 µm, 20 µm, any value therebetween, or other values. The thickness D1 and/or the gap D2 can be controlled according to the targeted physical characteristics of the tested sample. For example, the thickness D1 and/or the gap D2 can be controlled based on compressibility of blood cells, different shapes (natural or compressed) of the blood cells, the corresponding dimensions of the microchannel 230, or a combination thereof. In some embodiments, as illustrated in FIG. 2, as the electrode strips extend away from the microchannel 230 and toward an edge of the substrate 210, the thicknesses of and/or the gaps between the electrode strips can increase to dimensions appropriate for the electrodes to serve as contact pads.

The first and second regions 350 and 360 (e.g., as measured between middle strips 352b and 362b or another set of reference locations) can be separated by distance D3. The distance D3 can be 200 µm, 225 µm, 250 µm, any value therebetween, or other values. Referring next to FIG. 4B, which shows a top view of the electrode 240 in the cavity 222, a first electrode strip 422a into the cavity 222 and a second electrode strip 422b extends around the first electrode strip 422a. The separation distance D3 can be controlled according to a desired accuracy of the test, a targeted test duration, the tested physical characteristic of the sample, or the like.

Referring next to FIG. 4C, which illustrates a cross-sectional shape of the microchannel 230, the observation window 234 can have a width W and a height H. In some embodiments, the width W is less than the average diameter of an uncompressed red blood cell (or other particulate). In some embodiments, the height H is greater than the average height or thickness of an uncompressed red blood cell. Alternatively, the height H can be less than the average height or thickness of an uncompressed red blood cell. Accordingly, the microchannel 230 can be configured to allow one particle of interest (e.g., a single red blood cell) to enter and travel through at any given cross-section. Based on the at least one undersized dimension, the microchannel 230 can compress the traversing particle of interest (e.g., red blood cell). For example, the average human red blood cell can have a diameter of about 7-8 µm and a thickness of about 2-3 µm. Accordingly, the width W of the microchannel 230 can range between 2 and 12 µm (e.g., 6 µm), and the height H of the microchannel 230 can range between 1 and 5 µm (e.g., 3 µm). Dimensions can be selected based on the shape (e.g., rectangular, square, elliptical, circular, etc.) and dimensions of the cross-section of the microchannel 230.

In some embodiments, the width W and/or the height H can change (e.g., decrease) along the length of the microchannel 230. For example, the inlet portion of the observation window 234 (e.g., around the first region 350) can have a first width, and the width of the microchannel 230 can gradually decrease (e.g., linearly, exponentially) such that the outlet portion of the observation window 234 (e.g., around the second region 360) has a second width smaller than the first width. The first width can be about 8-12 μm (e.g., 10 μm) and the second width can be about 2-7 μm (e.g., 4.5 μm). A microchannel with a gradually narrowing width W can be advantageous when measuring the effect of the microchannel in compressing a red blood cell, such as by comparing characteristics of the red blood cell at the first region 350 and at the second region 360. For example, if the microchannel 230 has a constant width W along the observation window 234, a red blood cell may be compressed at both the first and second regions 350, 360, resulting in a relatively small difference in measured characteristics between the first and second regions 350, 360. By contrast, if the microchannel 230 has a narrowing width W along the observation window 234, a red blood cell may be not compressed or minimally compressed at the first region 350 and more compressed at the second region 360, resulting in a greater difference in measured characteristics between the first and second regions 350, 360. Additionally or alternatively, multiple sensor regions can be included along the decreasing widths of the microchannel 230. The resulting measurements (e.g., speeds and comparisons between the different speeds) at the different regions can be used to compare the speeds and/or changes in the speeds in correspondence with the decreasing widths.

For illustrative purposes, the cross-sectional shape is shown as a rectangular. However, it is understood that the cross-sectional shape can be different. For example, the cross-sectional shape of the observation window 234 can be an oval, a circle, a different polygon, or a polygon having rounded corners or arcs between sides. Moreover, the transition into and/or out of the observation window 234 (e.g., the compressing portion) can be shaped to geometrically promote one sample to enter the observation window 234 at a time.

Figure 5A:
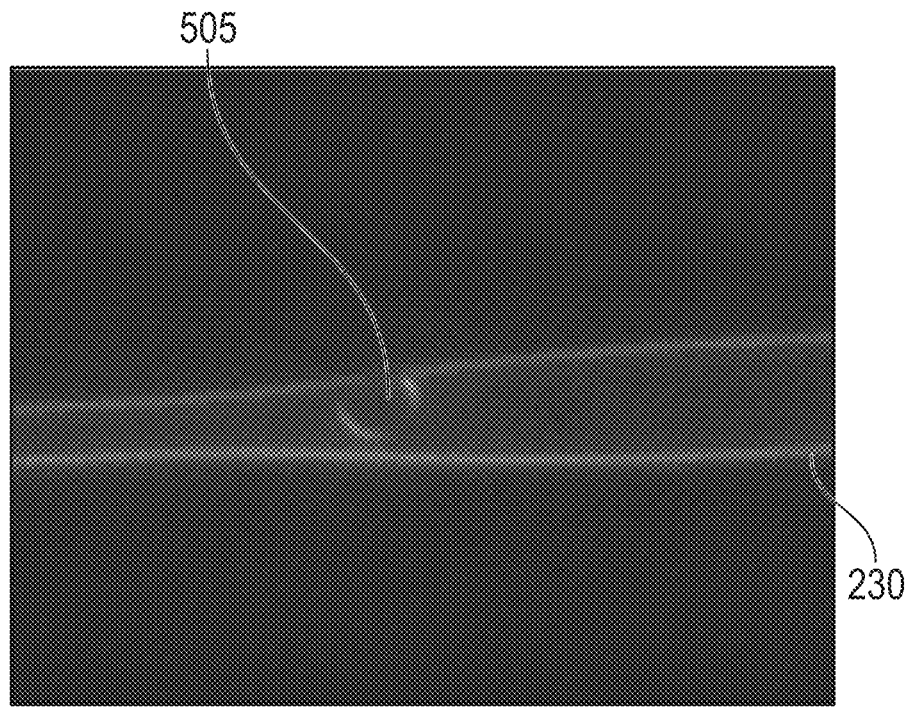
FIGS. 5A and 5B illustrate a red blood cell with a relatively normal glycated hemoglobin level at different positions along a microchannel in accordance with some embodiments of the present technology.
Figure 5B:
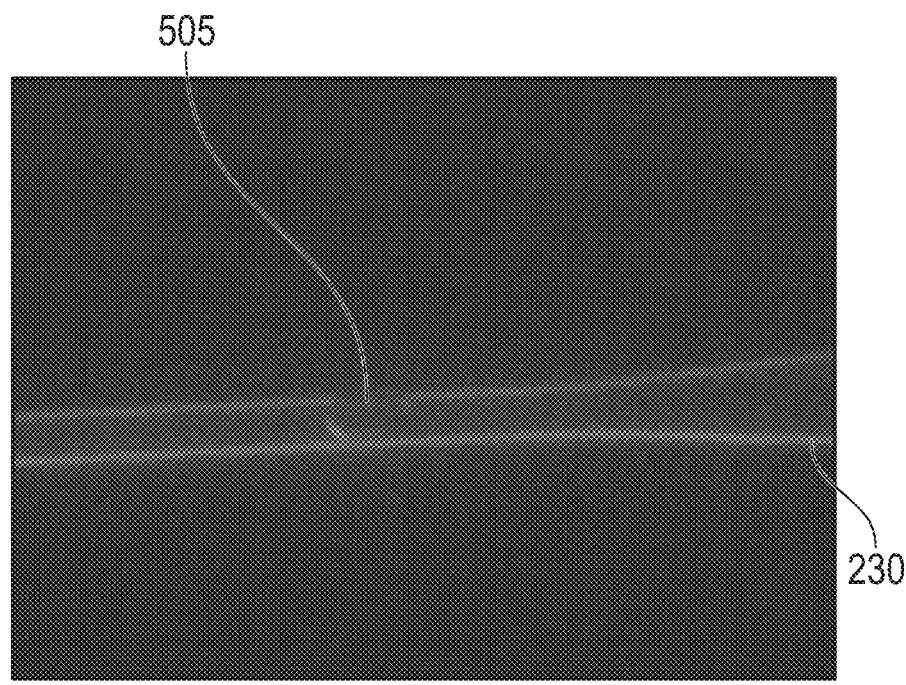
Figure 6A:
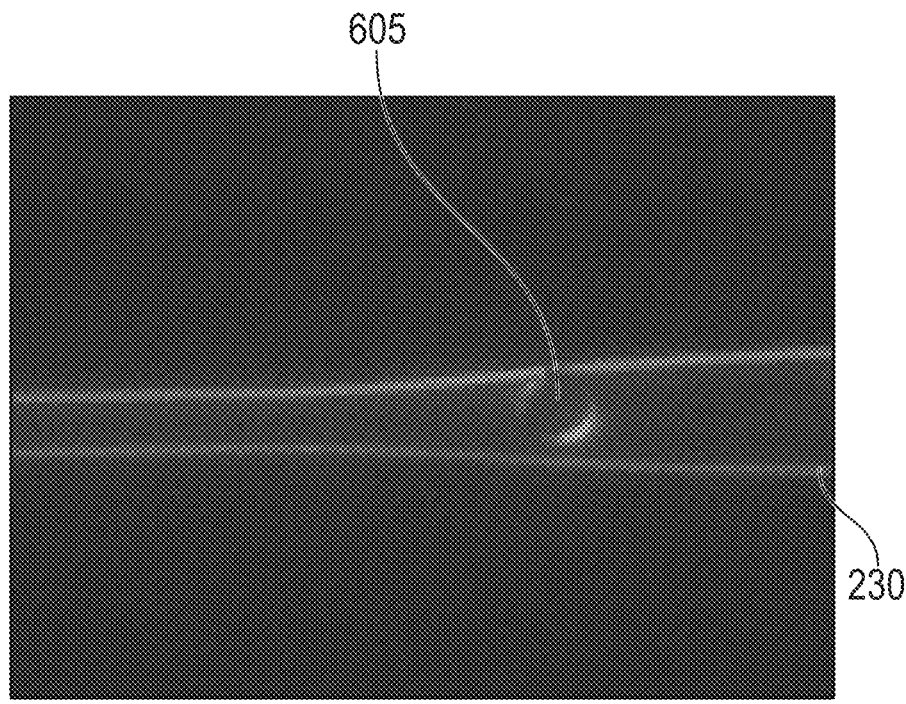
FIGS. 6A and 6B illustrate a red blood cell with a relatively high glycated hemoglobin level at different positions along a microchannel in accordance with some embodiments of the present technology.
Figure 6B:
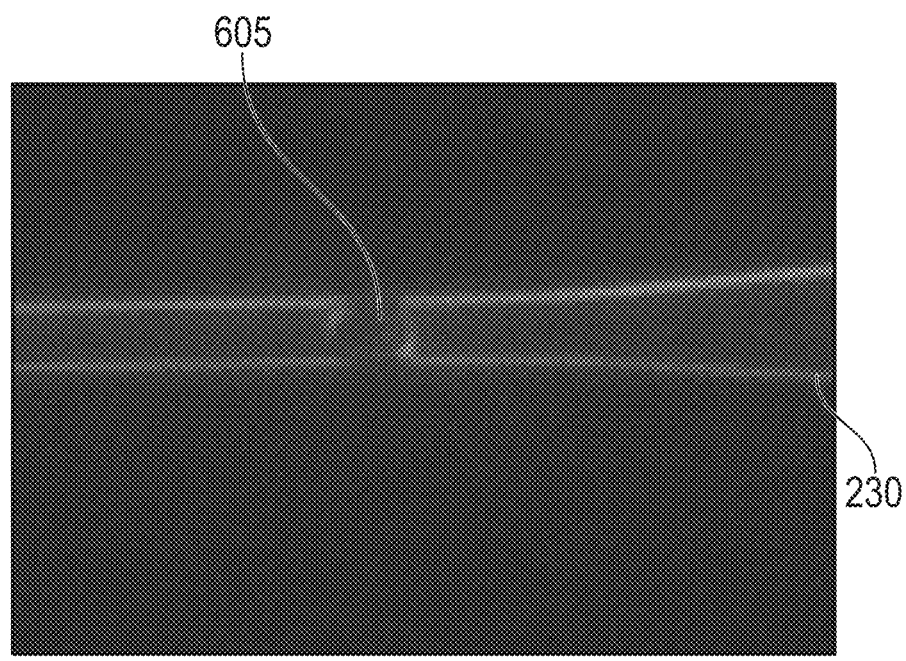

FIGS. 5A and 5B illustrate a first red blood cell 505 at a first position and a second position, respectively, along the microchannel 230. FIGS. 6A and 6B illustrate a second red blood cell 605 at the first position and the second position, respectively, along the microchannel 230. The second position (FIGS. 5B and 6B) is further down along the microchannel 230 than the first position (FIGS. 5A and 6A). As noted above with respect to FIG. 4C, the microchannel 230 can be sized to compress individual red blood cells. Accordingly, FIGS. 5A and 6A can illustrate the corresponding blood cells in relatively normal and non-compressed states, and FIGS. 5B and 6B can illustrate the corresponding blood cells in compressed states.

When hemoglobin in a red blood cell binds with glucose and become glycated, the elasticity of the red blood cell can decrease, causing the red blood cell to harden. A red blood cell with a higher glycated hemoglobin level can travel more slowly and take longer to pass through a portion or entire length of the microchannel 230 than a red blood cell with a non-glycated hemoglobin. Therefore, the travel time, velocity/speed, acceleration, stiffness, deformation, other measured travel parameters, their changes over time, the rate of such changes, and/or combinations thereof (e.g., weighted averages, ratios, and other comparison measures) of red blood cells traveling through the microchannel 230 can be used to determine the glycated hemoglobin level of those cells.

The first red blood cell 505 may have a relatively normal (e.g., within a recommended range according to healthcare professionals) glycated hemoglobin level, such as 5%. The first red blood cell 505 is therefore relatively compliant and deforms noticeably while traveling through the microchannel 230, as can be seen by comparing FIGS. 5A and 5B. On the other hand, the second red blood cell 605 may have a relatively higher glycated hemoglobin level, such as 8.2%. The second red blood cell 605 is therefore relatively stiffer and does not deform as much while traversing the same microchannel 230, as can be seen by comparing FIGS. 6A and 6B. Furthermore, as can be seen by comparing FIGS. 5B and 6B, the first red blood cell 505 can be asymmetric and/or elongated as shown in FIG. 5B, whereas the second red blood cell 605 may remain symmetric and/or not elongated as shown in FIG. 6B in correspondence with a higher stiffness and thus a higher glycated hemoglobin level.

Example Measurements and Analysis

FIGS. 7A and 7B illustrate steps for measuring an analyte in accordance with some embodiments of the present technology. Specifically, FIG. 7A illustrates a red blood cell 705 at five different positions and times along the microchannel 230 at the first region 350 as the red blood cell 705 travels in the travel direction TD across electrode strips 352a, 352b, 352c. FIG. 7B illustrates sensor readings from the electrode strips 352a, 352b, 352c corresponding to the five positions and times illustrated in FIG. 7A. During operation of the cartridge 102, a reference signal can be generated and communicated (e.g., by the analysis apparatus 104 of FIG. 1) to electrode strip 352b (indicated by Voltage$_{in}$). In some embodiments, the reference signal includes AC voltages (e.g., amplitude of 800 mV and frequency of 60 kHz). The signal can travel through the red blood cell 705 and/or electrolytes in the microchannel 230, depending on the position of the red blood cell 705, and return through electrode strips 352a and 352c (indicated by Voltage$_{out}$).

The graphs illustrated in FIG. 7B can represent a difference in the signals received at or through the electrode strips 352a and 352c. When the red blood cell 705 is in the first illustrated position at time $t_0$, the first region 350 is still absent of the red blood cell 705 (e.g., an initial state, such as before the voltage increase occurring up to t0), and the signal received at the electrode strip 352a is not yet affected by the red blood cell 705. The received signals at the electrode strips 352a and 352c can be equal to each other, and the difference can correspond to a predetermined or expected voltage level (e.g., 0V or a DC offset voltage).

When the red blood cell 705 is in the second illustrated position at time $t_1$, the red blood cell 705 is positioned between the electrode strips 352a and 352b. While the signal received at the electrode strip 352c essentially remains unchanged as before, the change in the signal at the electrode strip 352a can cause a change in the difference between the received voltages, and the change in the difference can increase as more of the red blood cell 705 is positioned between the electrode strips 352a and 352c. In some embodiments, a maximum or a positive peak in the sensor reading, as shown in the second graph of FIG. 7B, can correspond to when the red blood cell 705 is positioned about halfway between the electrode strips 352a and 352b.

When the red blood cell 705 is in the third illustrated position at time $t_2$, the signals received at the electrode strips 352a and 352c can be evenly affected by the presence of the red blood cell 705, leading to a zero reading in the signal difference (e.g., the corresponding sensor reading), as shown in the third graph of FIG. 7B. In general, the time $t_2$ can represent a transition point from the red blood cell 705 having more influence on the signal through the electrode 352a to that on the electrode 352c. The resulting voltage level may be equal to the level occurring during the initial state (e.g., 0V). For illustrative purposes, the time $t_2$ is shown as a center portion of the red blood cell 705 reaching a mid-point of the first region 350 and centered over the electrode 352b. However, it is understood that the time $t_2$ can correspond to a different or a non-centered condition, such as when the red blood cell 705 has a different or an irregular shape due to lower glycation level or a blood disease (e.g., sickle cell disease).

As the red blood cell 705 passes the electrode 352b, the red blood cell 705 can begin asserting more influence/change on the signal received at the electrode 352c and less on the signal received at the electrode 352a. As more of the red blood cell 705 overlaps the electrode 352c, the difference in the signal can increase in the opposite direction as during time $t_0$. For example, when the red blood cell 705 is in the fourth illustrated position at time $t_3$, the red blood cell 705 is positioned between the electrode strips 352b and 352c. While the signal received at the electrode strip 352a returns to the signal received before time $t_0$, the change in the signal at the electrode strip 352c can cause a change in the difference between the received voltages, and the change in the difference can increase as more of the red blood cell 705 is positioned between the electrode strips 352b and 352c. In some embodiments, a negative value, a minimum, or a trough in the sensor reading, as shown in the fourth graph of FIG. 7B, can correspond to when the red blood cell 705 is positioned about halfway between the electrode strips 352b and 352c.

When the red blood cell 705 is in the fifth illustrated position at time $t_4$, the first region 350 is once again absent of the red blood cell 705 (e.g., a terminal state), and the signal received at the electrode strip 352c is no longer affected by the red blood cell 705. The received signals at the electrode strips 352a and 352c can be equal to each other, and the difference can correspond to the predetermined or expected voltage level (e.g., 0V or a DC offset voltage).

The sensor readings can be used to determine various travel parameters (e.g., velocities/speeds, travel time, accelerations, ratios and other combinations or comparisons thereof) of the red blood cell 705, which can then be used to determine, for example, HbA1c levels. In some embodiments, a bridge circuit forms part of a sensor circuit to take the sensor readings. Moreover, the shape of the resulting graph can be analyzed to estimate a shape of the red blood cell 705 or a corresponding blood disease. For example, the times/durations and/or magnitudes before and after $t_1$ can be compared for symmetry. The differences across the midpoint at time $t_1$ can be used to further determine or verify the HbA1c levels. Additionally, the overall shape of the graph and/or the symmetry can be used (e.g., by comparing to one or more corresponding models or templates) to estimate, diagnose, confirm, or track one or more blood diseases.

Figure 7C:
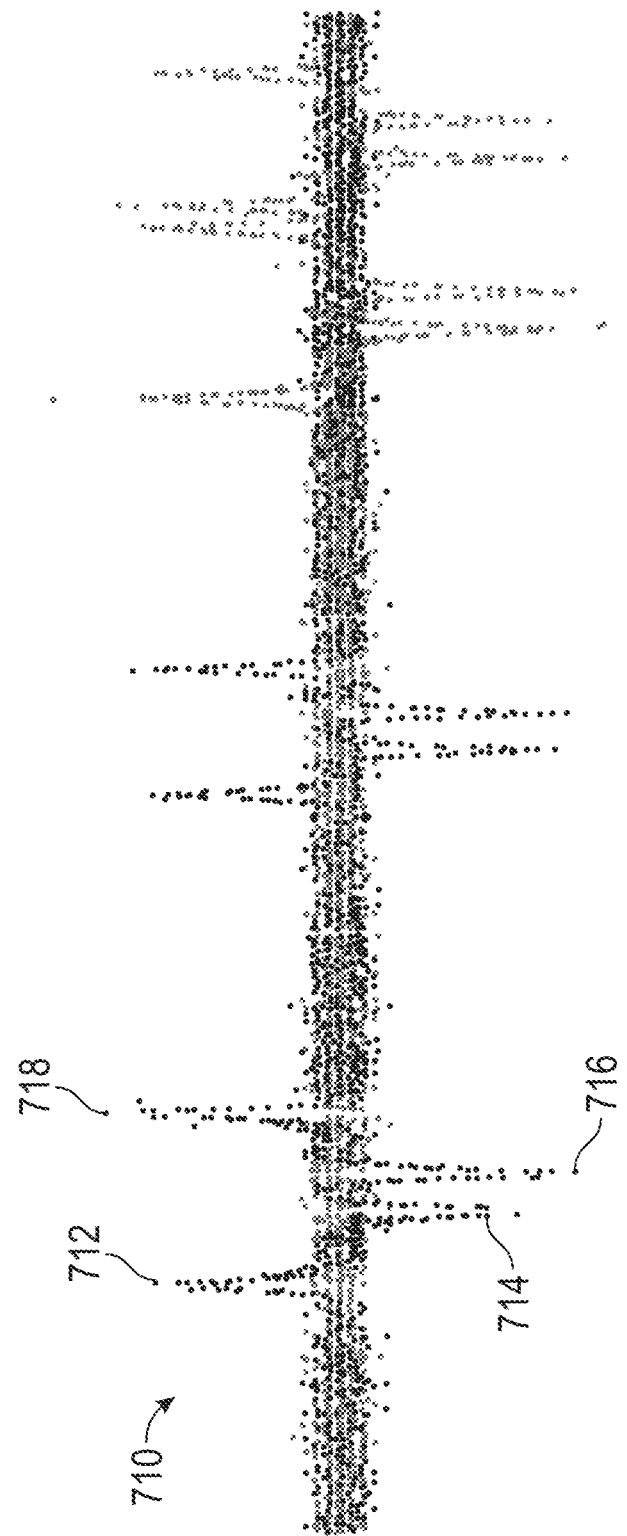
FIGS. 7C and 7D illustrate steps for obtaining measurements from signals in accordance with some embodiments of the present technology.
Figure 7D:
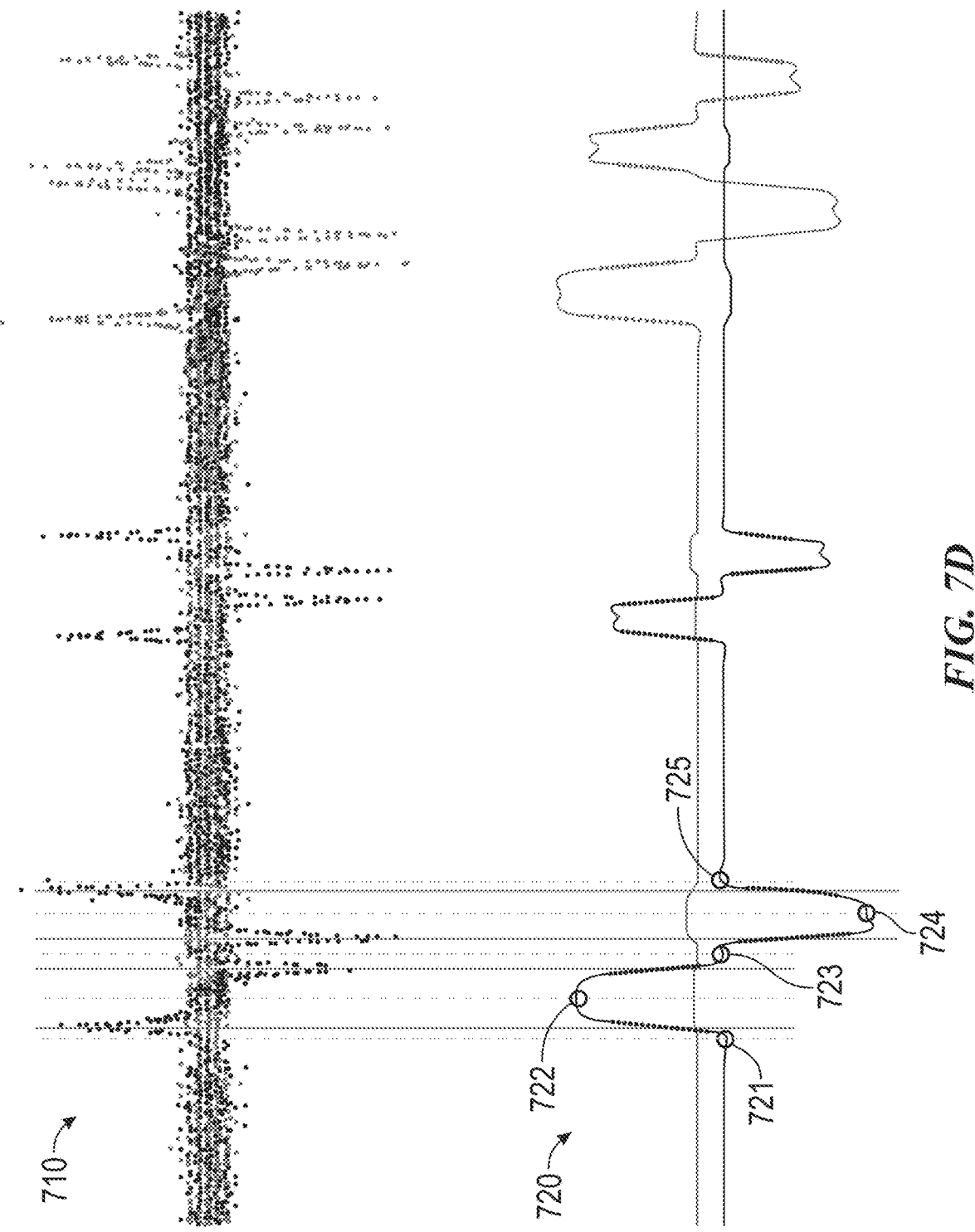

FIGS. 7C and 7D illustrate steps for obtaining measurements from signals in accordance with some embodiments of the present technology. In some embodiments, the sensor measurements can be sampled at a particular frequency (e.g., 2 kHz) to obtain the sensor reading shown in FIG. 7B. Accordingly, the sampled sensor readings can be separated by a corresponding period (e.g., 500 μm).

The voltage outputs (e.g., Voltage$_{out}$ of FIG. 7A and/or the computed difference of 7B) can have shapes that vary according to the travel speed of the red blood cell, the thickness of the electrodes, and other factors. The resulting signal can be asymmetric, include signal noise, and/or be otherwise have features that increase the difficulty in extracting the targeted patterns/features (e.g., peaks, troughs, mid-points, beginning, end). Therefore, it can be advantageous to plot the differences between time-adjacent data points, as illustrated in FIG. 7C. In other words, each data point can be a difference between a currently sampled measurement (e.g., the Voltage$_{out}$ value for a particular red blood cell at t=n) and a sample measurement that was obtained immediately before (e.g., the Voltage$_{out}$ value at t=n−1). Such difference values can be computed using registers, shift registers, rolling window, or the like that retain and update the previously measured value and the current value for each sampling period.

The plot 710 in FIG. 7C shows a first peak 712, a first trough 714, a second trough 716, and a second peak 718 for the computed difference values corresponding to one blood cell passing through a sensing zone. The plot 710 also shows noise effectively forming a band of random data points between the peaks and troughs, and throughout the plot. By plotting the differences between subsequent data points at constant time intervals, the plot 710 can also represent a derivative plot of a difference signal plot (e.g., the mathematical derivative plot of an example of the signal illustrated in FIG. 7B). In other words, the apparatus 104 and/or the server(s) 140/150 can calculate an instantaneous slope or a rate of change for the signal difference readings (e.g., the difference in the Voltage$_{out}$ at electrodes 352a and 352c).

For illustrative purposes, the plot 710 illustrates two red blood cells successively passing through the first test region 350 of FIG. 3 and the second test region 360 of FIG. 3. The set of peaks and troughs 712, 714, 716, 718 can correspond to a first red blood cell passing through the first test region 350, and the next set of peaks and troughs can correspond to a second red blood cell passing through the first test region 350. The next two sets of peaks and troughs can respectively correspond to the first and then the second red blood cells passing through the second test region 360.

FIG. 7D illustrates the plot 710 aligned with a plot 720, which can include example difference signals (e.g., examples of the signal illustrated in FIG. 7B). For illustrative purposes, the plot 720 shows a smoothed out plot of the signal (e.g., with significant signal noise removed). As shown, the signal in the plot 720 includes various data points, including a start point 721, a peak 722, a midpoint 723, a trough 724, and an end point 725. As mentioned above, signal noise, asymmetry in the signal, and other factors can make it difficult to identify the precise times at which the various data points 721-725 occur. Therefore, the plot 710 can be used to help identify timings of the various data points 721-725.

For example, the timing of the start point 721 can be identified by determining when the plot 710 begins to rise above the signal noise (e.g., a calculated signal-to-noise ratio (SNR) or a predetermined threshold value) by a certain degree (e.g., 3%, 5%, 7%). The timing of the peak 722 of the plot 720 can be identified by determining a midpoint (along the x-axis) between the first peak 712 and the first trough 714 of the plot 710. Since the plot 710 effectively represents a mathematical derivative or instantaneous slopes of the plot 720, the first peak 712 of FIG. 7C and the related "positive" values (values above the noise level) can correspond to a rising half (e.g., between the start point 721 and the peak 722) of the first peak 722 in the plot 720. Similarly, the first trough 714 and the corresponding "negative" values (values below the noise band) can correspond to the falling half (e.g., between the peak 722 and the midpoint 723) of the peak 722. Likewise, the second trough 716 can correspond to the falling half of the trough 724, and the second peak 718 can correspond to the rising/returning half of the trough 724.

Since the shape of the voltage difference signal is known for each blood cell passing through a sensor region, the timing of the peak 722 can be computed using the plot 710 as described above.

Similarly, the timing of the trough 724 of the plot 720 can be identified by determining a midpoint (along the x-axis) between the second trough 716 and the second peak 718 of the plot 720. Once the timings of the peak 722 and the trough 724 of the plot 720 are identified, the timing of the midpoint 723 of the plot 720 can be identified by determining a midpoint (along the x-axis) between the peak 722 and the trough 724.

As discussed above with respect to FIG. 4A, the thicknesses of the electrodes 352a, 352b, 352c can affect the signal. For example, relatively thick electrodes can result in the peak 722 or the trough 724 having flat portions, making identifying the precise timing of such data points from just the plot 720 difficult. Also, if there are flat portions or other irregularities in the signal, simply taking a maximum or minimum value of the plot can lead to inaccurate analysis results. Therefore, using the plot 710 to help identify the timing of various data points can lead to more accurate analysis results.

The steps illustrated and discussed above can be used with the electrode strips 362a, 362b, 362c at the second region 360 of FIG. 3 such that a first speed/velocity at the first region 350 (e.g., an entrance or inlet speed/velocity) and a second speed/velocity at the second region 360 (e.g., an exit or outlet speed/velocity) can both be determined for the same target. The cartridge 102 thereby enables determination of changes, ratios, or other comparisons between different points along the microchannel 230. The cartridge 102 can also enable measurement of other parameters, such as fluid velocities, volumetric flow rates, or the like. Details of example sensor circuits and their measurement operations are further disclosed in U.S. Pat. No. 11,747,348, filed Dec. 9, 2022, and titled "APPARATUS FOR MEASURING GLYCATION OF RED BLOOD CELLS AND GLYCATED HEMOGLOBIN LEVEL USING PHYSICAL AND ELECTRICAL CHARACTERISTICS OF CELLS, AND RELATED METHODS," and U.S. Patent Application Publication No. US2023/0105313, filed Dec. 9, 2022, and titled "APPARATUS FOR MEASURING PROPERTIES OF PARTICLES IN A SOLUTION AND RELATED METHODS," the disclosures of which are incorporated herein by their entireties. For example, a first resistor can be coupled to the electrode 352a and a second resistor having a same resistance value can be coupled to the electrode 352c. The sensor circuit can combine (e.g., a subtraction, such as using one negating circuit and an adding circuit) the voltages measured at the first and second resistors to determine the difference in the two signals. Accordingly, along with the electrodes and the intrinsic resistance between the individual electrodes, the first and second resistors can effectively form a bridge circuit.

Figure 8:
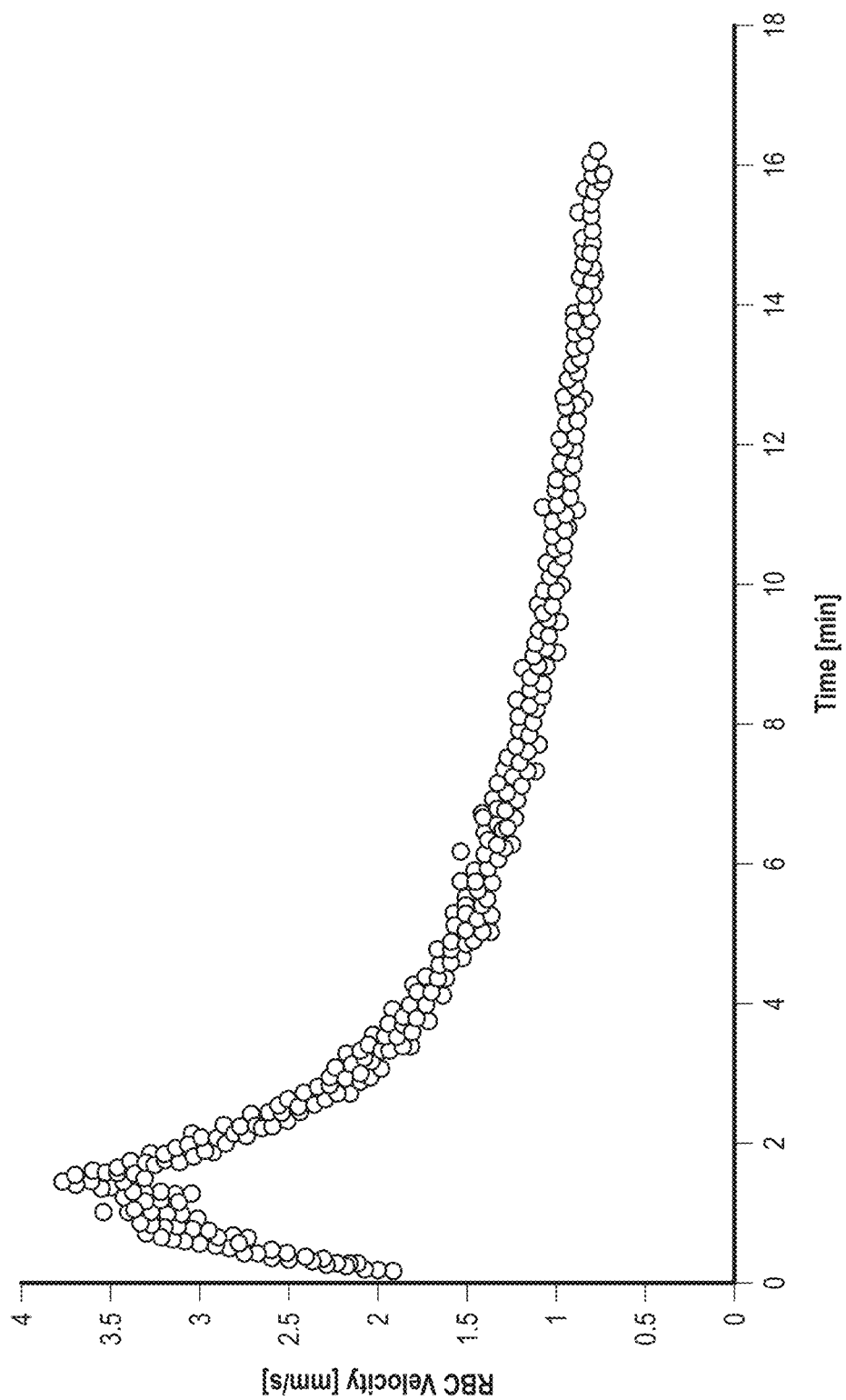
FIG. 8 is a plot of red blood cell velocity in a capillary sensor in accordance with some embodiments of the present technology.

FIG. 8 is a plot of velocities (in mm/s) for multiple red blood cells against time (minutes) in a capillary sensor in accordance with some embodiments of the present technology. More specifically, FIG. 8 illustrates how the velocities of red blood cells (e.g., as measured at one location along the microchannel 230) change as more red blood cells are introduced into and exit out of the microchannel 230 of FIG. 2 throughout a measurement period. As shown, the velocities can exhibit an initial rise in velocity followed by an exponential decay in velocity. In other words, an initial set of blood cells may move faster at the beginning of a test, and subsequent samples may move slower as the test progresses.

This may be attributable to, for example, the capillary action that initiates the sample flow, the amount of samples in the opening and the collection pool, and the evaporation at the end of the microchannel, as discussed above with respect to FIG. 2. In some cases, measurements of different samples, measurements of different particulates (e.g., white blood cells), and/or measurements taken using different types of sensors can exhibit different velocity profiles over the measurement period, and can also be affected by varying environmental factors (e.g., temperature, humidity, pressure), experimental conditions (channel dimension error, surface roughness), and other factors that may affect speed. Moreover, the collected sample includes younger or newer blood cells that have less glycation (e.g., due to less exposure) than other blood cells that more accurately reflect the patient's condition. One method may be to focus the analysis on a portion of the velocity/time graph, such as a portion in the declining or terminal section (e.g., a percentage delay or a predetermined offset after the peak velocity). Another method, as discussed further herein, can be to calibrate and/or normalize the data to compensate for the variations (e.g., sample-to-sample variations) described above.

Figure 9A:
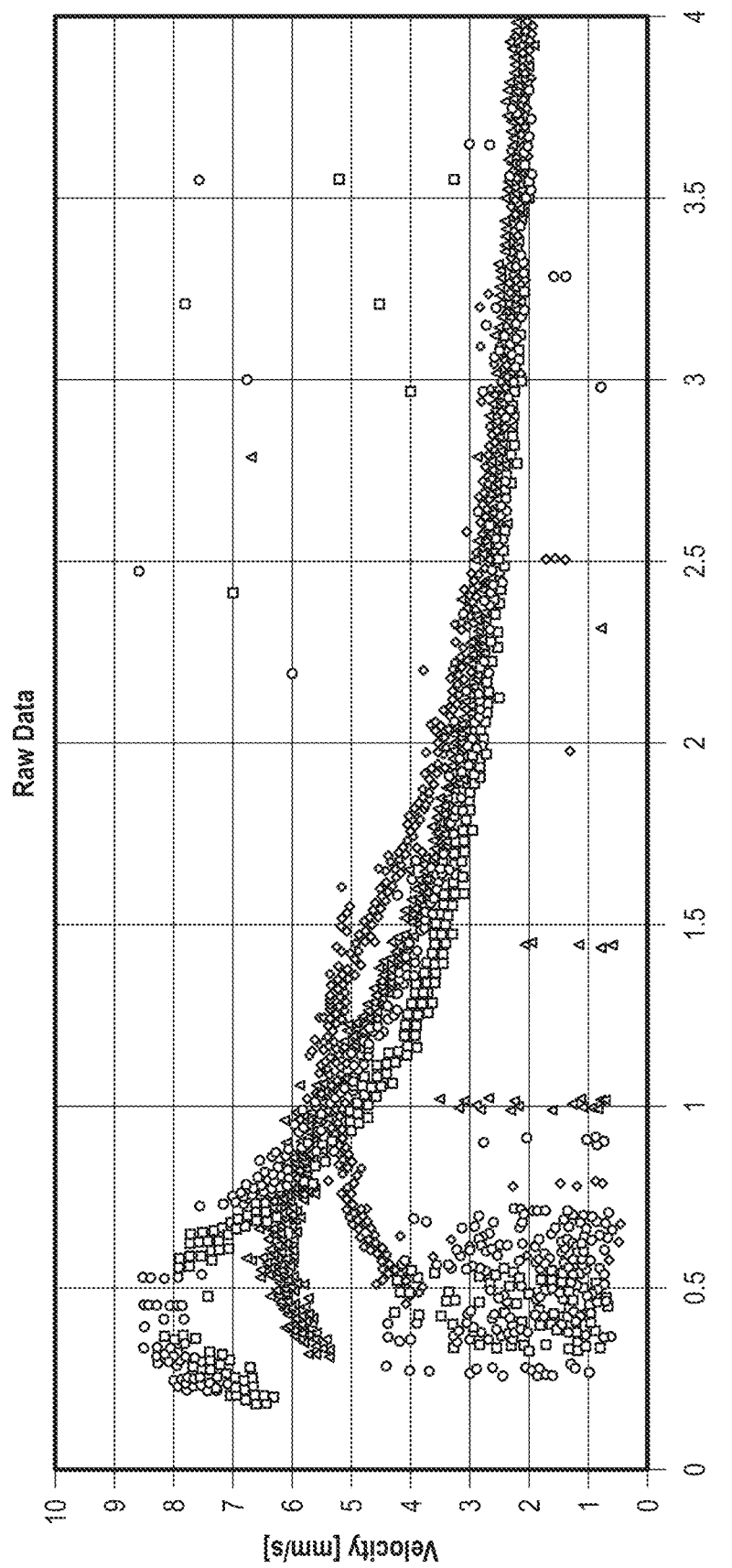
FIGS. 9A-9C are plots of red blood cell velocity data, velocity data after time calibration, and velocity data after time and velocity calibration, respectively, from one user in accordance with some embodiments of the present technology.
Figure 9B:
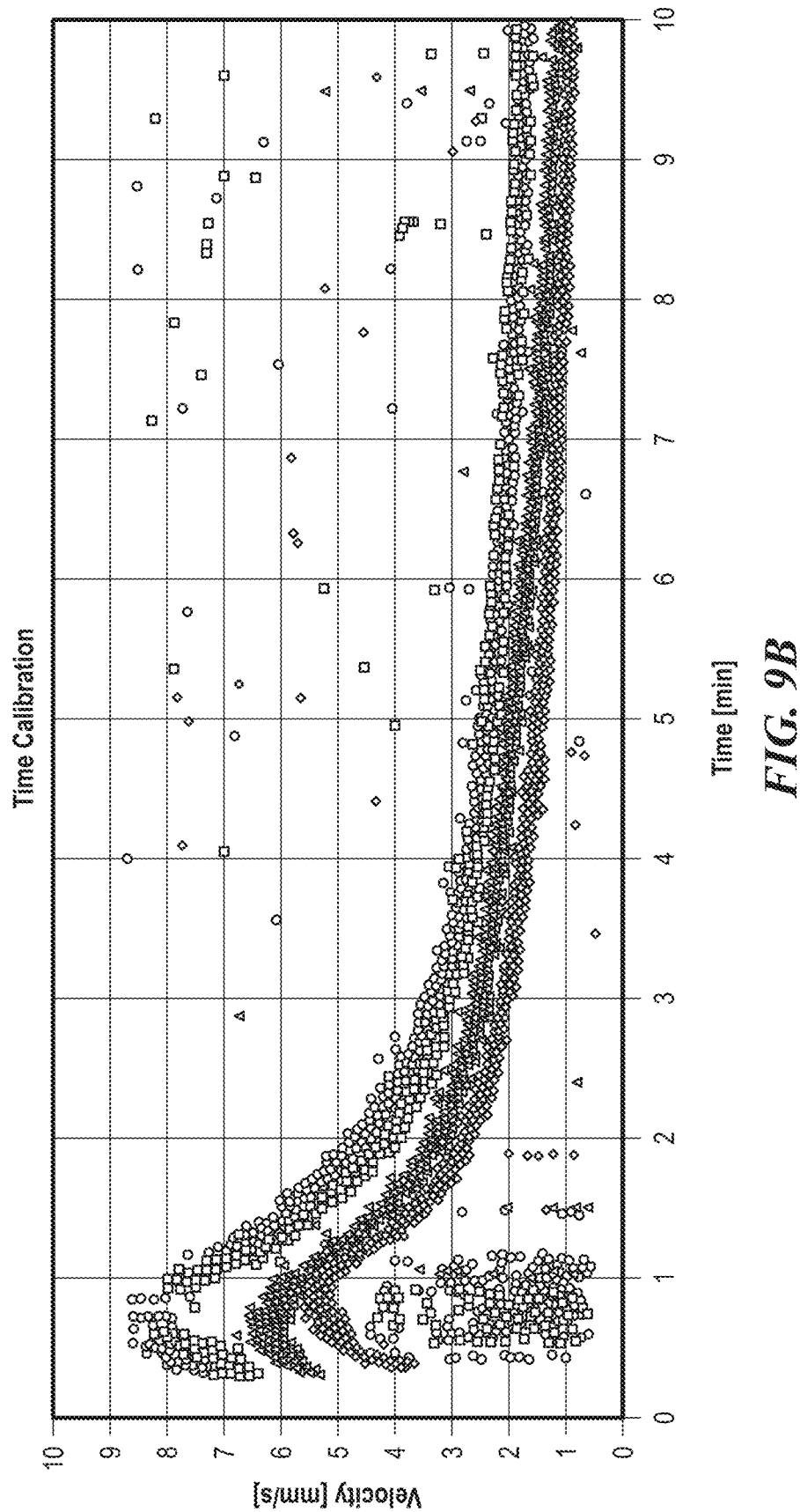
Figure 9C:
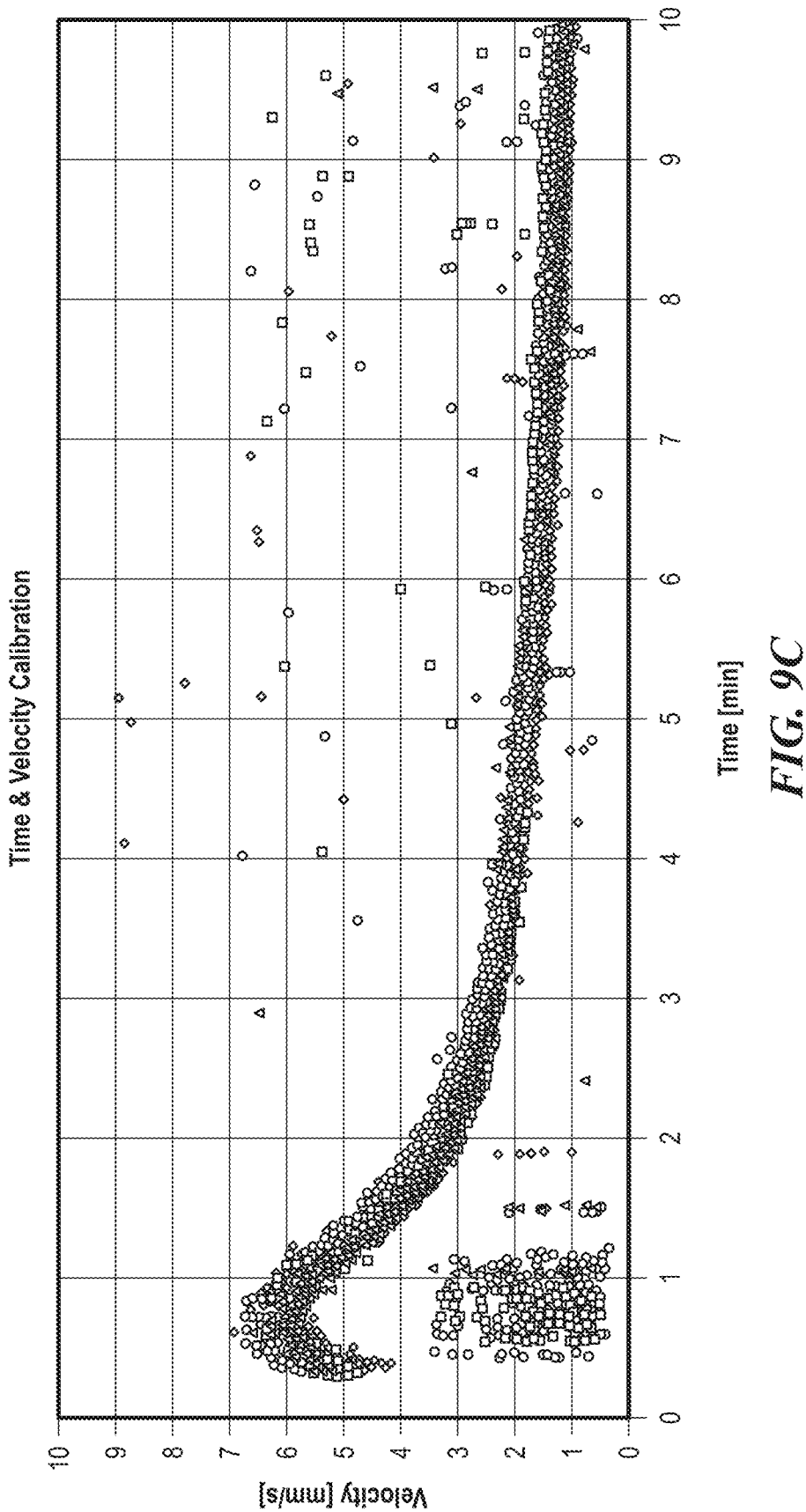

FIGS. 9A-9C are plots of red blood cell velocity data, velocity data after time calibration, and velocity data after time and velocity calibration, respectively, of multiple samples from one user in accordance with some embodiments of the present technology. As shown in FIG. 9A, raw red blood cell velocity data for different samples, even if from the same user, can exhibit different patterns, such as due to environmental or other factors described above. To perform time calibration, the x-axis of each sample data can be adjusted such that the peak velocities align, as shown in FIG. 9B. After time calibration, the velocity data for the different samples may exhibit generally similar decay trends (e.g., shapes, slopes or their rate of change, or the like). To perform velocity calibration, velocity can be correlated with $1/t^{0.5}$ per the Washburn equation. After time and velocity calibration, as shown in FIG. 9C, other variations such as environmental effects and experimental errors can be removed for data analysis, comparison between samples, comparison between different users, etc.

In some embodiments, the apparatus 104 of FIG. 1 and/or the servers 140/150 of FIG. 1 can interact with the user to analyze multiple samples. The apparatus 104 and/or the servers 140/150 can use the result of the multiple samples to perform the velocity and/or time calibrations for the user.

Figure 10:
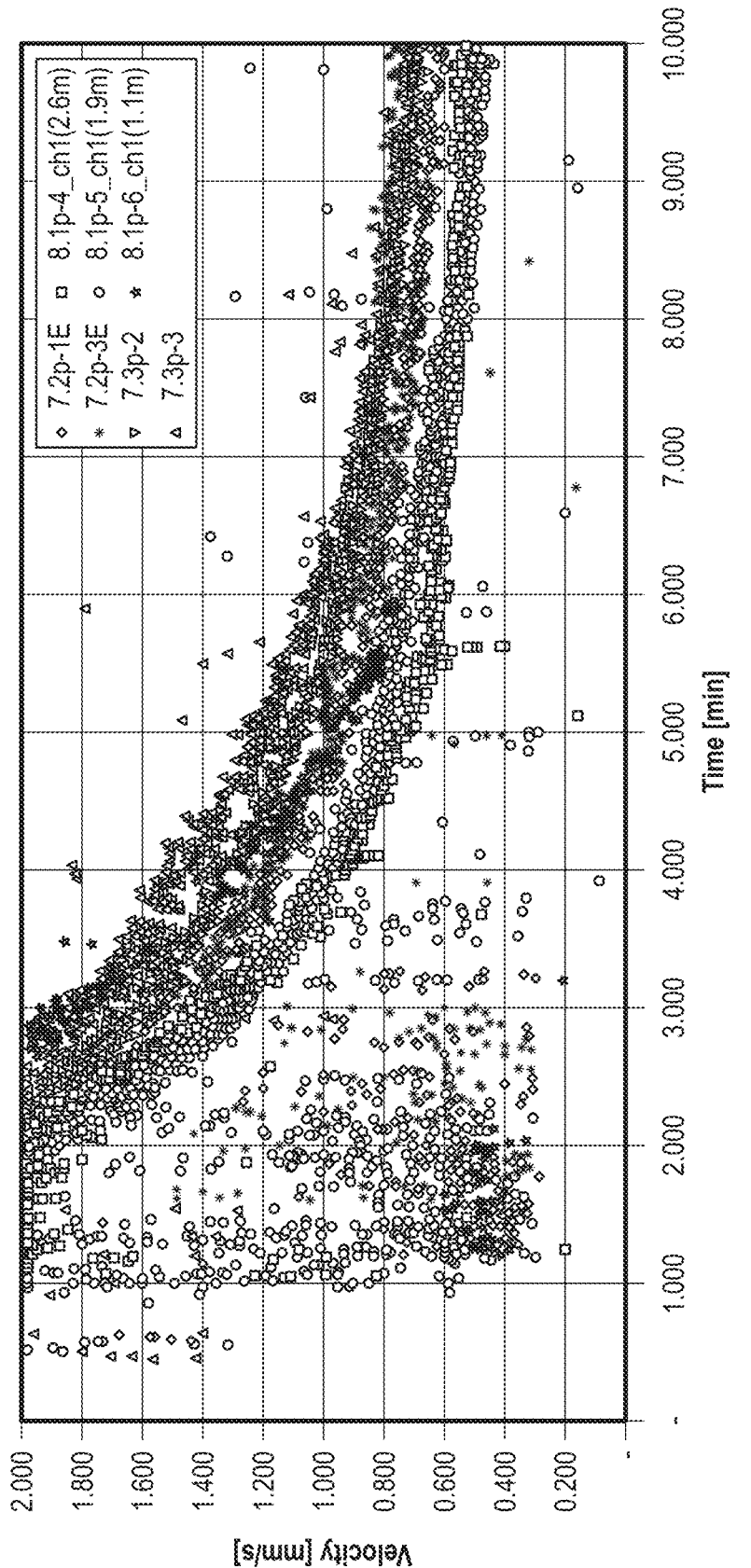
FIG. 10 is a plot of red blood cell velocity data after time and velocity calibration from three users in accordance with some embodiments of the present technology.

FIG. 10 is a plot of red blood cell velocity data after time and velocity calibration from three users in accordance with some embodiments of the present technology. Specifically, a first user has a 7.2% National Glycohemoglobin Standardization Program (NGSP) HbA1c level, a second user has a 7.3% NGSP HbA1c level, and a third user has an 8.1% NGSP HbA1c level. As shown, red blood cells of users with higher HbA1c levels exhibit generally lower velocities than red blood cells of users with lower HbA1c levels. This can be attributable to, for example, the fact that higher glycation levels lead to stiffer red blood cells, resulting in slower velocity while traveling through the microchannel 230. In other words, the stiffer red blood cells may have higher entry speeds (e.g., the speeds across the first region 350 of FIG. 3) than exit speeds (e.g., the speeds across the second region 360 of FIG. 3)

Figure 11A:
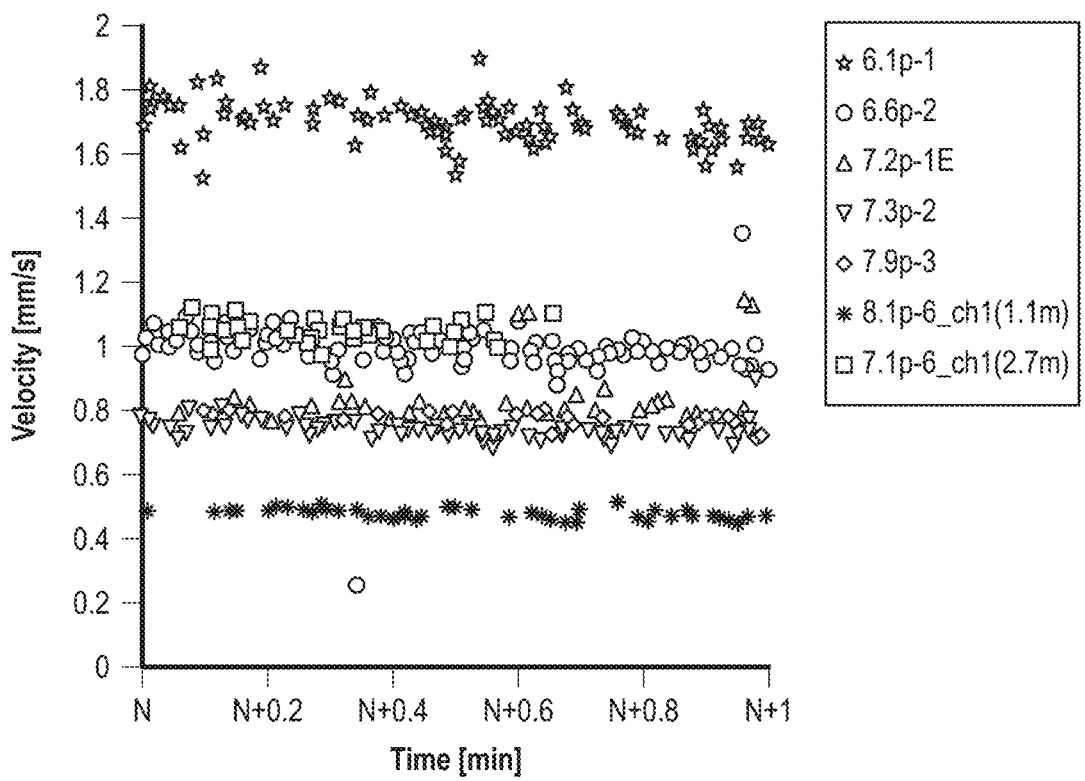
FIGS. 11A and 11B are plots of red blood cell velocity data after time and velocity calibration from seven users in accordance with some embodiments of the present technology.
Figure 11B:
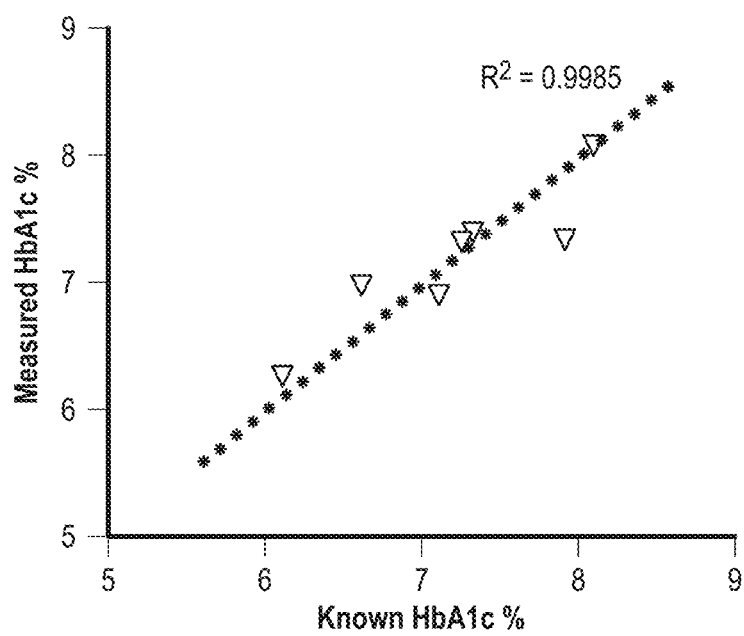

FIGS. 11A and 11B are plots of red blood cell velocity data after time and velocity calibration from seven users in accordance with some embodiments of the present technology. Specifically, a first user has a 6.1% HbA1c level, a second user has a 6.6% HbA1c level, a third user has a 7.1%

HbA1c level, a fourth user has a 7.2% HbA1c level, a fifth user has a 7.3% HbA1c level, a sixth user has a 7.9% HbA1c level, and a seventh user has an 8.1% HbA1c level (all per NGSP). The plot of FIG. 11A focuses on a period [N] to [N+1] minutes occurring after the peak velocity (e.g., period occurring after at least 5 minutes from the beginning of the sample flow), which may correspond generally to when the velocity data becomes stable. As shown, samples from users with higher HbA1c levels exhibit generally slower velocities.

FIG. 11B plots the HbA1c levels as measured by embodiments of the present technology against known HbA1c levels (e.g., measured using methods based on protein quantification) for the seven users. As shown, the coefficient of determination is nearly 1, indicating the accuracy and reliability of the present technology in measuring HbA1c values. In other words, the glycation levels computed using the apparatus(es) and/or the methods described above were sufficiently close (according to the $R^2$ value of 0.9985) to the actual known glycation levels of the tested patients.

Figure 12:
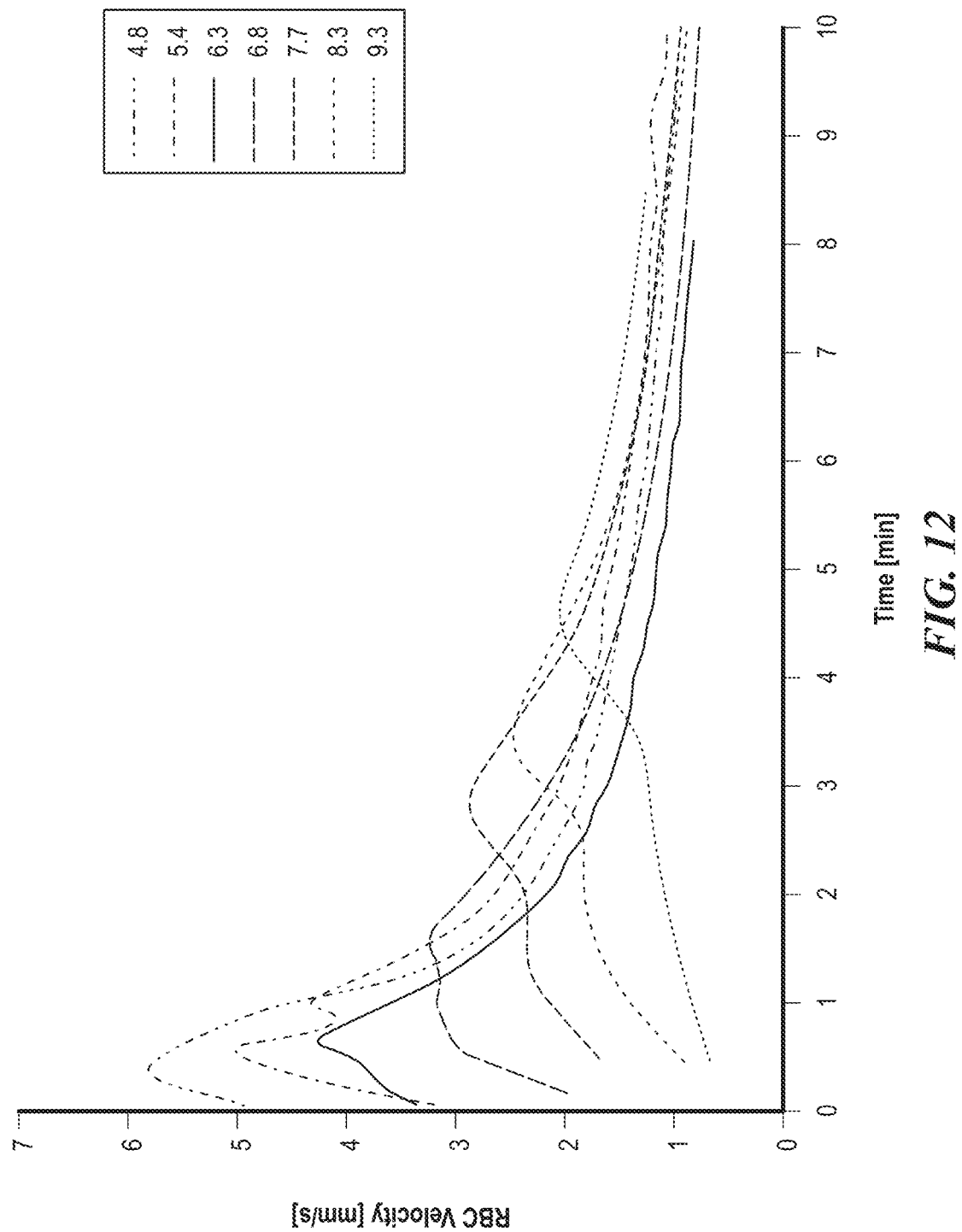
FIG. 12 is a plot of red blood cell velocity data for seven different samples in accordance with some embodiments of the present technology.

FIG. 12 is a plot of red blood cell velocity data for seven different samples in accordance with some embodiments of the present technology. As shown, higher HbA1c levels, and thus higher rigidity of red blood cells, can cause the peak velocity to be lower and occur at a later time. Accordingly, the calibration and the corresponding processing according to the peak velocity values as described above can increase the accuracy of the computed glycation level of the tested patient.

Figure 13:
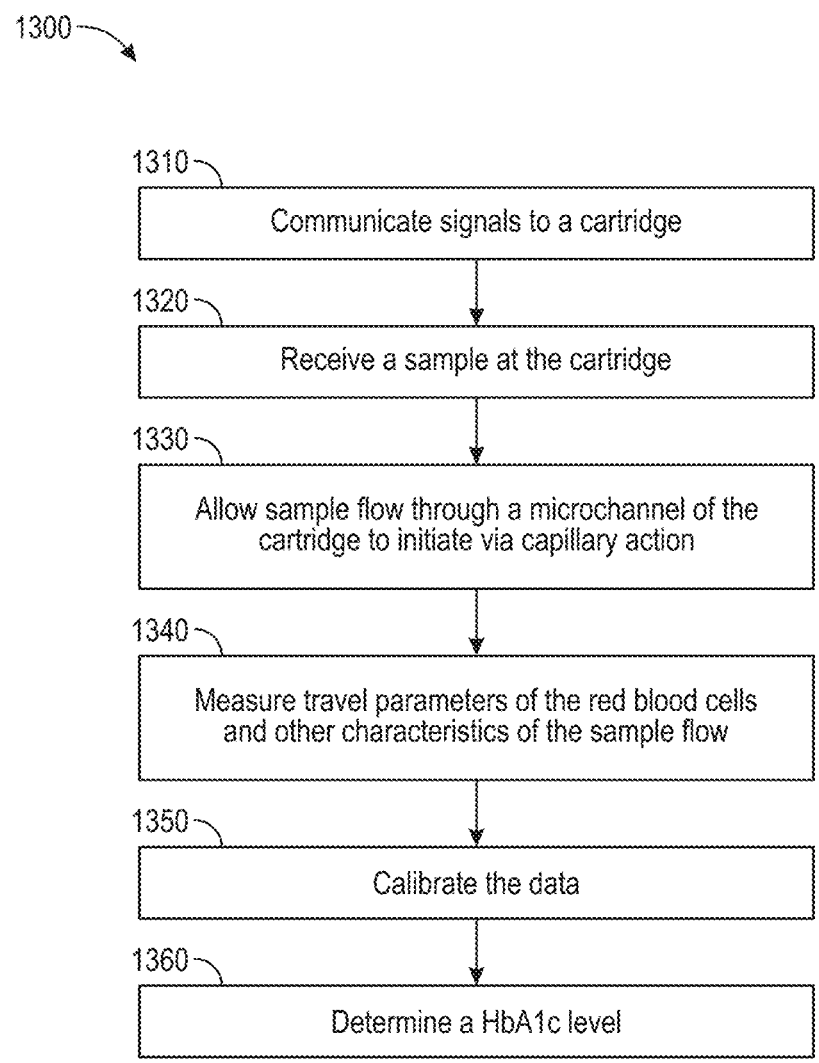
FIG. 13 is a flowchart illustrating a method for measuring glycated hemoglobin level in accordance with some embodiments of the present technology.
Figure 14A:
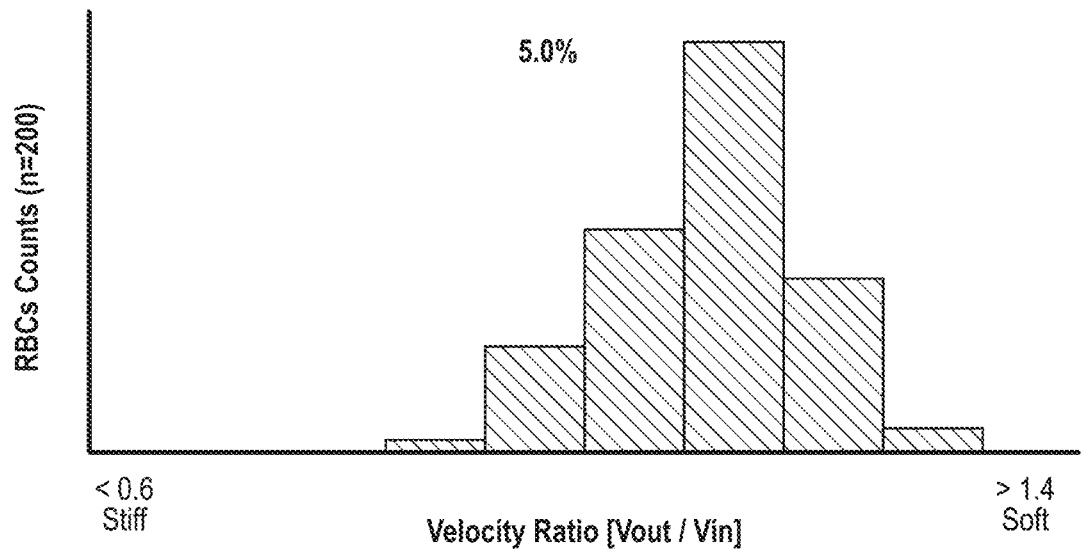
FIGS. 14A-14D are plots of normalized red blood cell velocity data for four samples in accordance with some embodiments of the present technology.
Figure 14B:
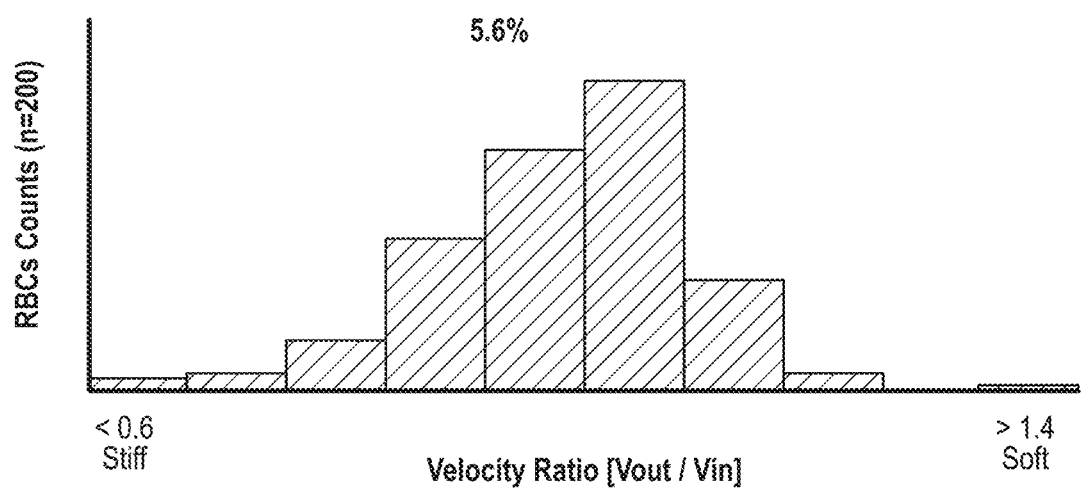
Figure 14C:
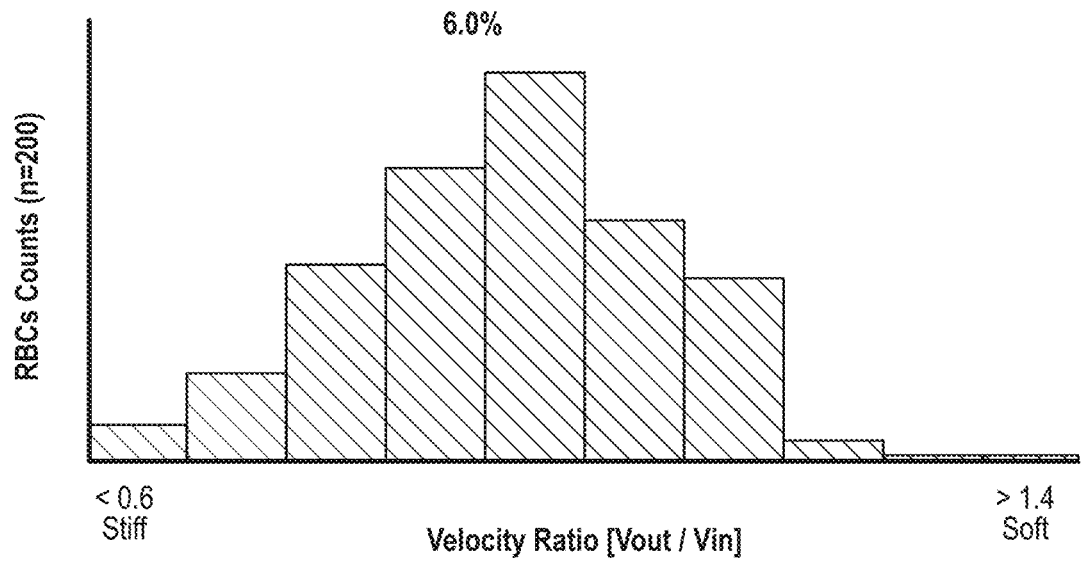
Figure 14D:
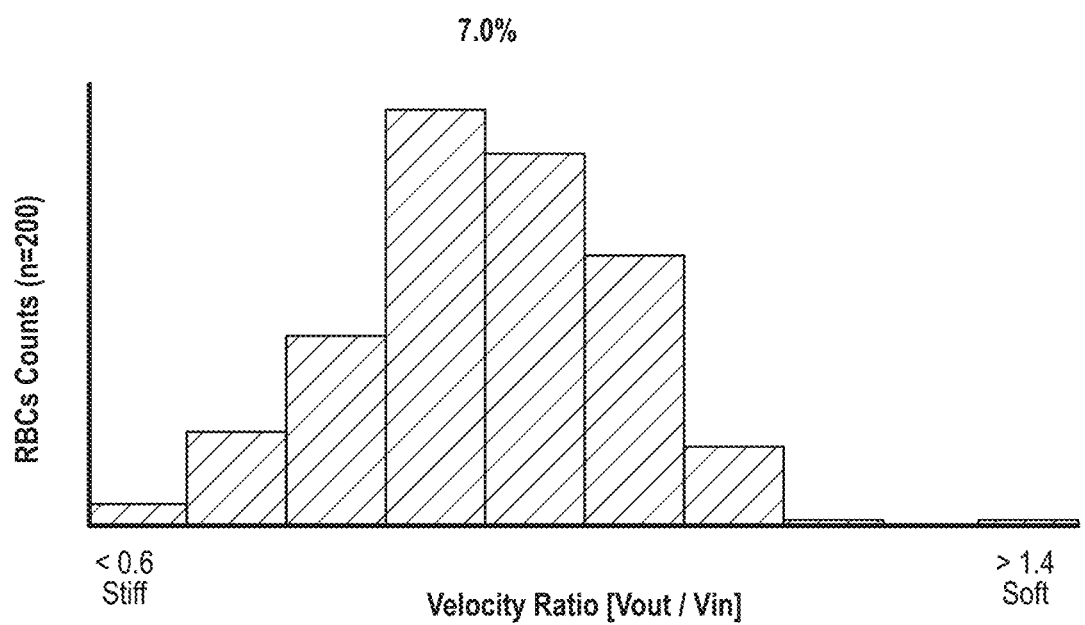

FIG. 13 is a flowchart illustrating a method 1300 for measuring glycated hemoglobin level in accordance with some embodiments of the present technology. While the method 1300 is described below with reference to components illustrated and described above with respect to FIGS. 1-12, the method 1300 can be used with other systems and devices. The method 1300 can include, at block 1310, communicating one or more signals to the cartridge 102. For example, the signals can be reference signals generated by the analysis apparatus 104. The signal can travel through the electrodes as described above. The method 1300 can include, at block 1320, receiving a sample at the cartridge 102. For example, a user can provide a drop of blood into the cavity 222. In some embodiments, the blocks 1310 and 1320 can be reversed, such as by the patient user providing the blood into the cavity 222 and then inserting the cartridge 102 into the apparatus 104. The method 1300 can include, at block 1330, having or allowing sample flow through the microchannel 230 to initiate via capillary action. As discussed above, the microchannel 230 can include certain materials with desired hydrophilicity levels and geometries such that capillary action alone can be relied upon to initiate the sample flow.

The method 1300 can include, at block 1340, measuring travel parameters of the red blood cells (or other particulates in the received sample) and/or other characteristics of the sample flow. As discussed above, the travel parameters can include velocities/speeds, travel time, acceleration, combinations thereof, etc., and other characteristics of the sample flow can include total flow rate. In some embodiments, the method can also include waiting until the sample flow reaches the end of the microchannel and/or until the velocity data settles (e.g., measured using a predetermined test duration or relative to a real-time measured peak speed). The method 1300 can include, at block 1350, calibrating the data. In some embodiments, the data is calibrated using the measured flow rate. In some embodiments, the data is calibrated according to the steps described above with respect to FIGS. 9A-9C, such as using one or more previous tests and/or relative to the peak speed. The method 1300 can include, at block 1360, determining a Hb1Ac level. In some embodiments, the glycated hemoglobin level is determined based on the measured and calibrated data. For example, the apparatus 104 and/or the servers 140/150 can compare one or more of the speeds (e.g., entry and exit speeds and/or speeds for red blood cells measured during the targeted time window) to a predetermined set of glycation levels, such as using a look up table. Additionally or alternatively, the apparatus 104 and/or the servers 140/150 can use a predetermined equation or a method to calculate the patient user's glycation level according to the speed and the corresponding stiffness of the red blood cells.

FIGS. 14A-14D are plots of normalized red blood cell velocity data for four samples in accordance with some embodiments of the present technology. As discussed above, the velocity or speed of red blood cells traveling through the microchannel 230 can change depending on the rigidity of the cells and environmental and/or experimental factors. Moreover, without an active pumping mechanism to control the flow rate, the cartridge 102 of FIG. 1 may be more susceptible to variability of the velocity given the passive movement mechanism of the microchannel 230. Further, velocity, whether the inlet velocity, the outlet velocity, the total velocity, etc., is generally affected by environmental factors. Comparing the velocities at different points in the microchannel 230, such as by calculating a ratio between the speeds across the first and second regions, can remove or at least partially cancel out one or more of the variability factors, leaving primarily the effect of the rigidity of the cells in the comparison result. Therefore, using the comparison results for the glycation computation is another method of calibrating or normalizing the data to account for variability across different samples and/or users. One advantage of using the comparison between different velocities over the calibration method discussed above with respect to FIGS. 9A-9C and 13 is that the analysis need not wait until the velocity settles down, which can occur, for example as seen in FIG. 8, five or more minutes after receiving the sample.

Specifically, FIGS. 14A-14D are histograms plotting distribution of red blood cells velocity ratios from users with a 5.0% HbA1c level, a 5.6% HbA1c level, a 6.0% HbA1c level, and a 7.0% HbA1c level, respectively. The velocity data is normalized by taking the ratio between a first velocity and a second velocity. In the illustrated graphs, the first velocity corresponds to an inlet velocity ($V_{in}$) that is taken at, for example, the first region 350 of FIG. 3 and the second velocity corresponds to an outlet velocity ($V_{out}$) that is taken at, for example, the second region 360 of FIG. 3. As shown, red blood cells associated with higher HbA1c levels generally exhibit lower velocity ratios (measured as $V_{out}/V_{in}$). The observed pattern is attributable to the fact that red blood cells with higher glycated hemoglobin levels are stiffer, and thus slow down more as they travel along the microchannel 230. Accordingly, the apparatus 104 of FIG. 1 and/or the servers 140/150 of FIG. 1 can use the comparison results, such as the ratio of the velocities, of the patient user to compute the patient user's glycation level.

In operation, the cartridge 102 can be used to generate a velocity ratio distribution graph for a particular sample (e.g., by the analysis apparatus 104) or a corresponding result (e.g., a shape, a peak value, an average value, or a combination thereof), and the glycated hemoglobin level for that particular sample can be determined based on the generated graph/result (e.g., by considering the mean, the median, the standard deviation, skewness).

Figure 15:
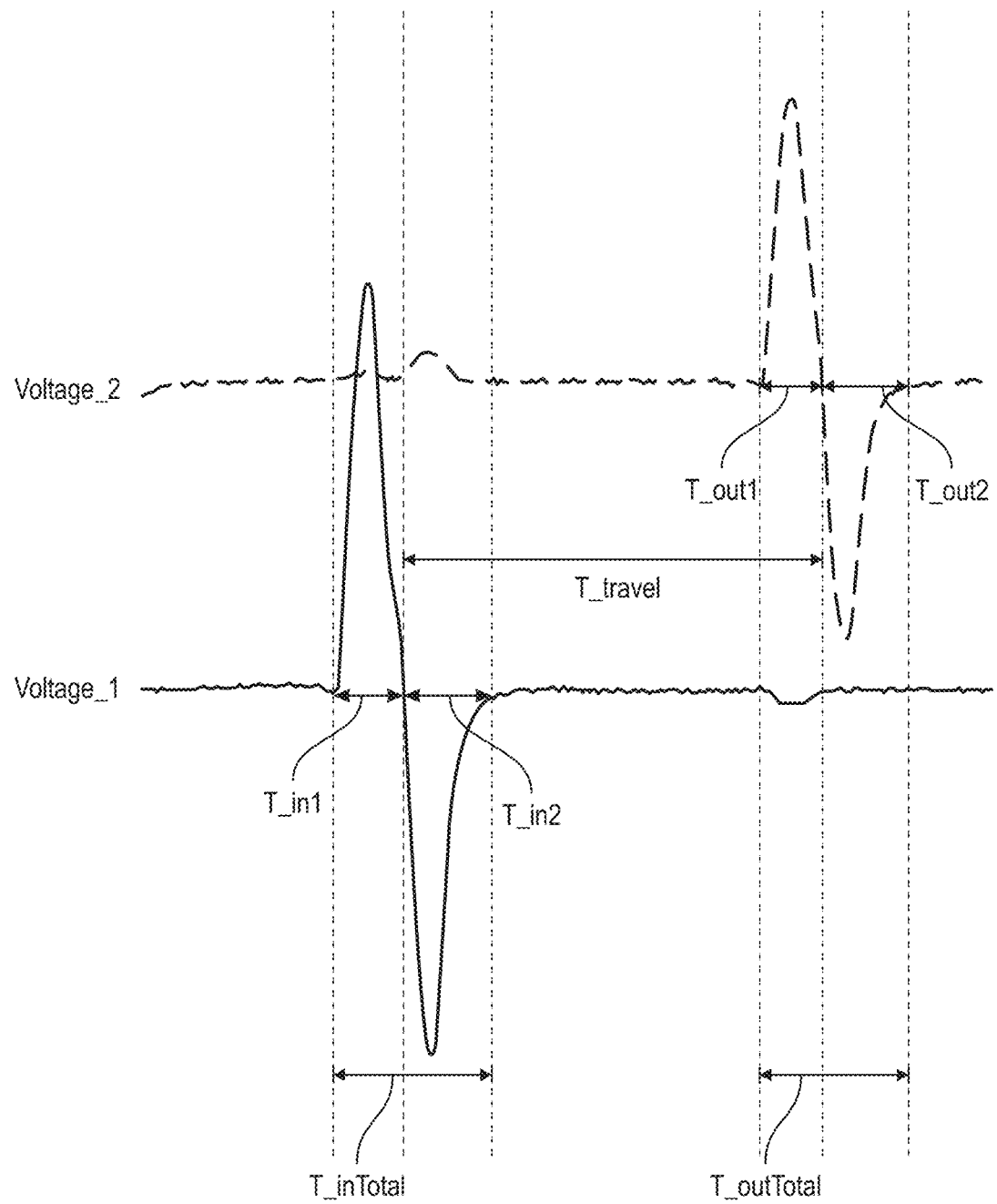
FIG. 15 illustrates sensor readings in accordance with some embodiments of the present technology.

FIG. 15 illustrates sensor readings in accordance with some embodiments of the present technology. Specifically, FIG. 15 shows a first voltage reading Voltage$_1$ and a second voltage reading Voltage$_2$, where Voltage corresponds to the sensor reading at the first region 350 of FIG. 3 as a single red blood cell passes through the first region 350 and Voltage$_2$ corresponds to the sensor reading at the second region 360 of FIG. 3 as the same red blood cell passes through the second region 360. The generation of these voltage signals is described in detail above with respect to FIGS. 7A and 7B.

As shown, various measurements can be taken based on the Voltage$_1$ and Voltage$_2$ signals. For example, the time it takes for the red blood cell to travel from one electrode strip to the next (e.g., $T_{in1}$, $T_{in2}$, $T_{out1}$, $T_{out2}$), the time it takes for the red blood cell to travel across one region (e.g., $T_{inTotal}$, $T_{outTotal}$), and the time it takes for the red blood cell to travel from the first region 350 to the second region 360 (e.g., $T_{travel}$) can be measured based on the wavelengths, portions thereof, and/or the period between the two voltage signals. Other measurements are within the scope of the present technology. For example, the period between the two peaks, the period between the two troughs, widths of the peaks and/or troughs, general shapes or outlines of the peaks and/or troughs, and/or any combinations of the aforementioned values can be used. Since specific distances along the microchannel are known and/or can be measured, the speed or velocity of the red blood cell at a specific point along the microchannel 230 or an average speed or velocity across a specific portion of the microchannel 230 can be determined. Therefore, the velocity ratios that can be determined and plotted can include a ratio between the inlet velocity and an overall (e.g., average) velocity, a ratio between the outlet velocity and the overall velocity, etc. The choice of the type of ratio can be made depending on the characteristics of the measurement sensors, the error magnitude, etc. The distribution graph of velocity ratios can then be used to determine a person's HbA1c level, as described above with respect to FIGS. 14A-14D.

Further, the shapes and widths of the peaks and troughs can be used to estimate a shape profile for the blood cell. For example, the $T_{in1}$ can be compared to $T_{in2}$, or similarly the magnitudes and/or the curve shapes for the corresponding periods to compute a measure of symmetry for the blood cell. Additionally or alternatively, the shapes of the peaks or troughs can be compare to one or more predetermined template shapes and generate a corresponding measure (e.g., using differences between the shapes). The symmetry measure and/or the shape comparison measure can be used to further compute or validate the patient user's HbA1c level. For example, a stiffer blood cell will experience a relatively larger speed change and slow down more throughout the microchannel while retaining a more symmetrical shape as described above. Accordingly, the resulting speed ratio can have a correlation to the symmetry measure. The apparatus 104 and/or the servers 140/150 can use a look up table or a predetermined equation/process that defines thresholds for such correlation. When the red blood cell measurement deviates from the expected correlation, the apparatus 104 and/or the servers 140/150 can categorize the measurement as an anomaly. The anomalies can be excluded from the overall calculation for the HbA1c level and/or trigger a separate analysis, such as for estimating other blood diseases. For such assessments, the apparatus 104, the servers 140/150, or a combination thereof can analyze the shapes and/or the symmetry measure as described above. Furthermore, in some embodiments, the amplitude of the signals or ratios (or other combinations thereof) can be used to determine a size and/or other characteristics of the red blood cell.

Figure 16A:
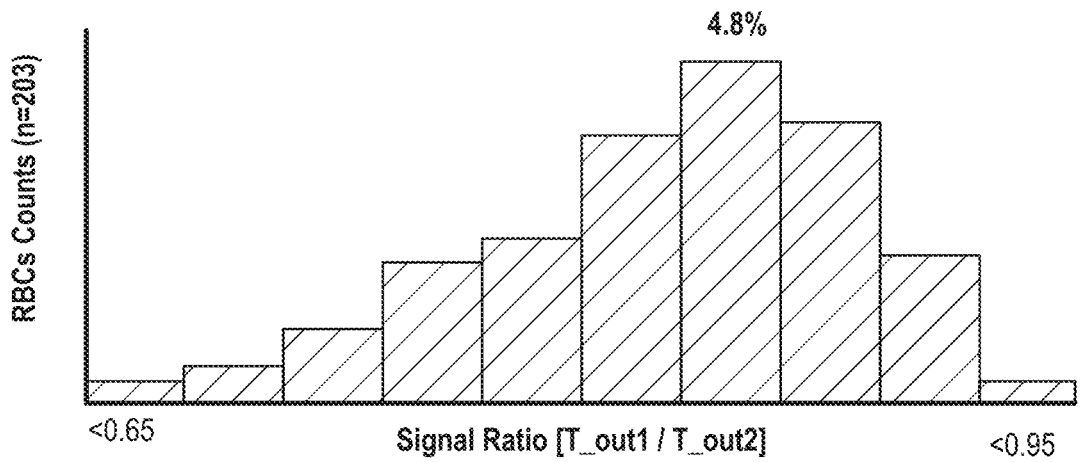
FIG. 16A-16C are plots of normalized red blood cell sensor readings for three samples in accordance with some embodiments of the present technology.
Figure 16B:
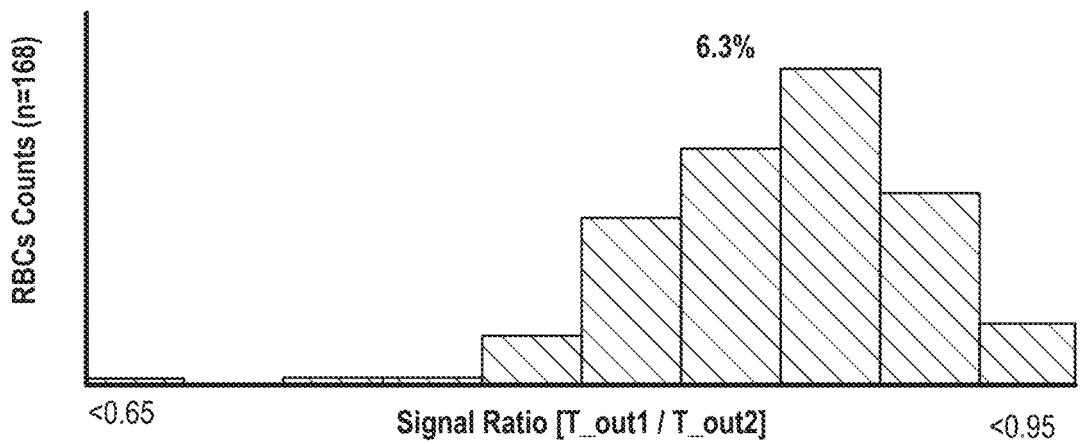
Figure 16C:
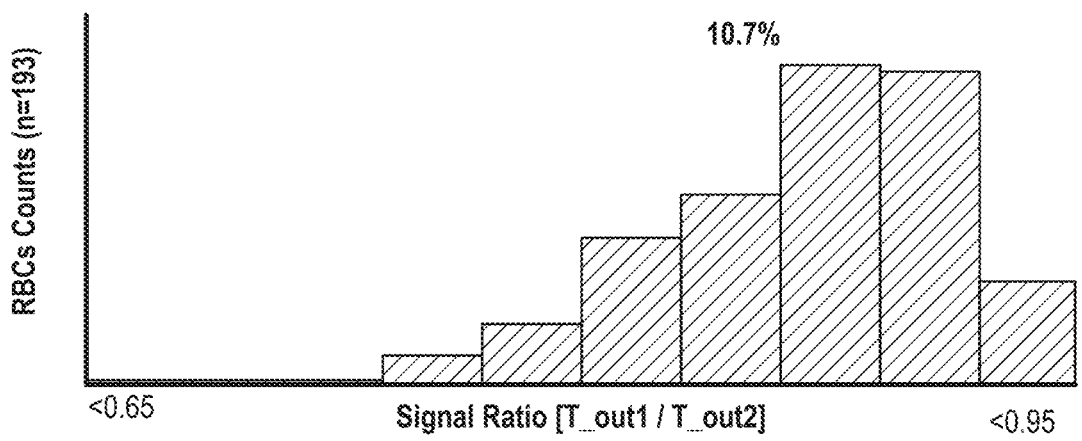

FIG. 16A-16C are plots of normalized red blood cell sensor readings for three samples in accordance with some embodiments of the present technology. As described above with respect to FIGS. 5A-6B, red blood cells with lower glycated hemoglobin levels are more compliant, so they may deform more than red blood cells with higher glycated hemoglobin levels due to, for example, high fluid velocities. Such deformation can lead to asymmetry in the red blood cell. By contrast, red blood cells with higher glycated hemoglobin levels are stiffer, so they may deform less and better maintain symmetry as they pass through the microchannel 230 of FIG. 2. Therefore, it can be advantageous to plot the distribution of ratios between the period of the peak (e.g., $T_{out1}$ as indicated in FIG. 15) and the period of the trough (e.g., $T_{out2}$ as indicated in FIG. 15) of a voltage signal associated with one or each region. By way of illustration, FIGS. 16A-16C are histograms plotting distribution of red blood cell period ratios between $T_{out1}$ and $T_{out2}$ (see FIG. 15) from users with a 4.8% HbA1c level, a 6.3% HbA1c level, and a 10.7% HbA1c level, respectively. As shown, samples with higher HbA1c levels (e.g., FIG. 16C) include stiffer red blood cells that do not deform as much, so the ratios are less distributed and are closer to 1. On the other hand, samples with lower HbA1c levels (e.g., FIG. 16A) include softer red blood cells that deform more, so the ratios are more distributed and are farther away from 1. Therefore, an analysis apparatus can also determine a glycated hemoglobin level based on a distribution of period ratios. For example, the apparatus 104 of FIG. 1, the servers 140/150 of FIG. 1, or a combination thereof can calculate the symmetry measure for each blood cell readings using the red blood cell period ratios between $T_{out1}$ and $T_{out2}$. The apparatus 104, the servers 140/150, or a combination thereof can compute the distribution of the symmetry measures, such as using histograms or plots, for analysis. The apparatus 104, the servers 140/150, or a combination thereof can include predetermined relationships or patterns, such as via look up tables or predetermined equations, that represent the correlations or the links between the different symmetry measures and the corresponding stiffness and glycated hemoglobin levels. Accordingly, apparatus 104, the servers 140/150, or a combination thereof can use the computed the distribution of the symmetry measure or a statistical result thereof (e.g., mean, median, deviation, peak, etc.) to the predetermined relationships or patterns to compute the glycated hemoglobin level of the patient user.

As indicated in FIGS. 14A-14D and 16A-16C, the number of red blood cells used to plot the distribution of ratios can vary. For example, in some embodiments, the number of red blood cells measured and plotted can be at least 50, 100, 150, 200, 250, 300, 350, 400, 450, 500, between 50-500, between 150-300, or any other value. In some cases, the number of red blood cells that can be used in the analysis may be constrained by other factors. For example, when measuring deformation and/or degree of symmetry of red blood cells, as illustrated and described above with respect to FIGS. 16A-16C, the effect of fluid velocity may be large and so only red blood cells falling within a specified range of fluid velocities may be suitable for analysis.

Figure 17:
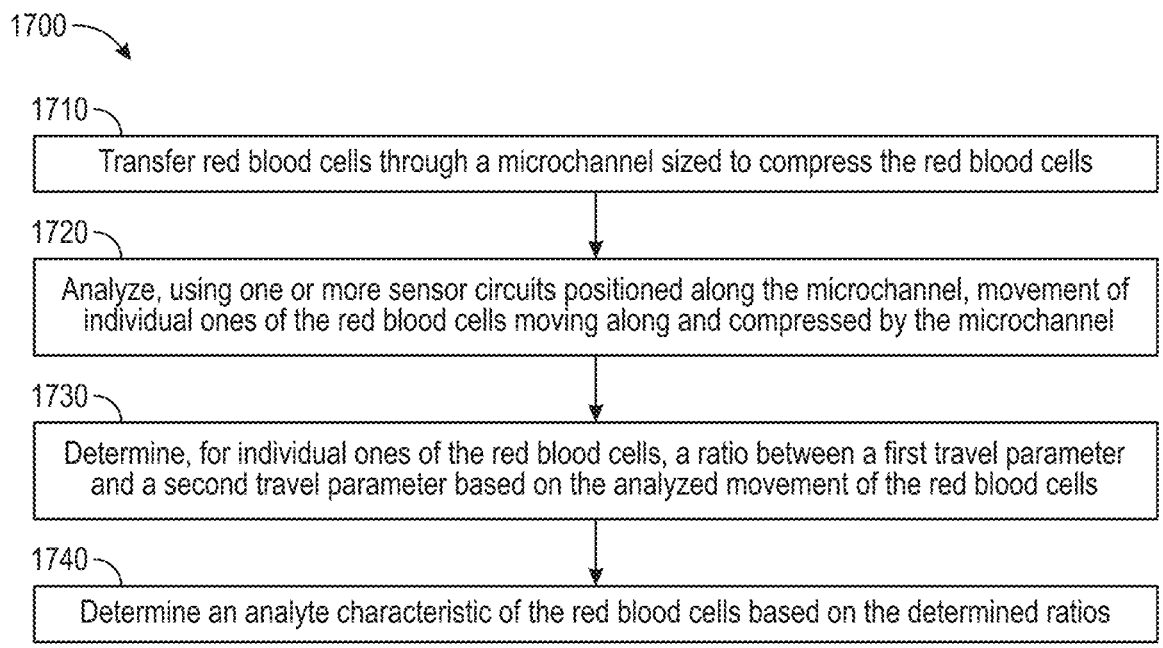
FIG. 17 is a flowchart illustrating a method for analyzing red blood cells in a patient blood sample in accordance with some embodiments of the present technology.

FIG. 17 is a flowchart illustrating a method 1700 for analyzing red blood cells in a patient blood sample in accordance with some embodiments of the present technology. The method 1700 can include, at block 1710, transferring red blood cells from the patient blood sample through a microchannel sized to compress the red blood cells. As discussed above with respect to FIG. 4C, the microchannel 230 can be narrower than an average red blood cell. The method 1700 can include, at block 1720, analyzing, using one or more sensor components positioned along the microchannel, movement of individual ones of the red blood cells moving along and compressed by the microchannel. In some embodiments, the sensor components can include the electrodes 240 and/or the electrode strips (e.g., strips 352a, 352b, 352c, 362a, 362b, 362c) electrically coupled to a detection portion (e.g., resistors connected to ground) as described above such that a reference input signal can be sent through portions of the microchannel and/or the red blood cells, and read by the detection portion.

The method 1700 can include, at block 1730, determining, for individual ones of the red blood cells, a ratio between a first travel parameter and a second travel parameter based on the analyzed movement of the red blood cells. As discussed above, each of the first and second travel parameters can include travel time (wavelength or portions thereof), velocity/speed (instantaneous or average), acceleration, stiffness, deformation, degree of symmetry, etc. In some embodiments, the sensor circuit can generate a signal that indicates a speed of the corresponding red blood cell at each of the sensing regions in the microchannel 230. The ratio can be derived using the speeds of the same red blood cell at different sensing regions. The method 1700 can include, at block 1740, determining an analyte characteristic of the red blood cells based on the determined ratios. In some embodiments, analyte characteristic can indicate a glycated hemoglobin level (e.g., HbA1c percentage).

In the case of an error condition in the microchannel 230 (e.g., a second red blood cell entering the observation window 234 prior to a first red blood cell leaving the observation window 234, causing overlap), the electrodes at the first region 350 may detect two separate red blood cells, but the electrodes at the second region 360 may detect only one red blood cell due to the error condition. In this case, the next reading by the electrodes at the second region 360 may actually correspond to a third red blood cell, but may be interpreted as the second red blood. In some embodiments, such error conditions are automatically detected based at least on the observed abnormal passage speed given the average speed of a red blood cell traveling through the microchannel (e.g., 0.2 to 6.0 mm/sec). The glycated hemoglobin level measuring system may consequently omit those abnormal signal readings instead of pairing the wrong inlet and outlet measurements. This abnormality detection may also be based on a predetermined average time period necessary for a red blood cell to travel from the first region 350 to the second region 360.

Figure 18:
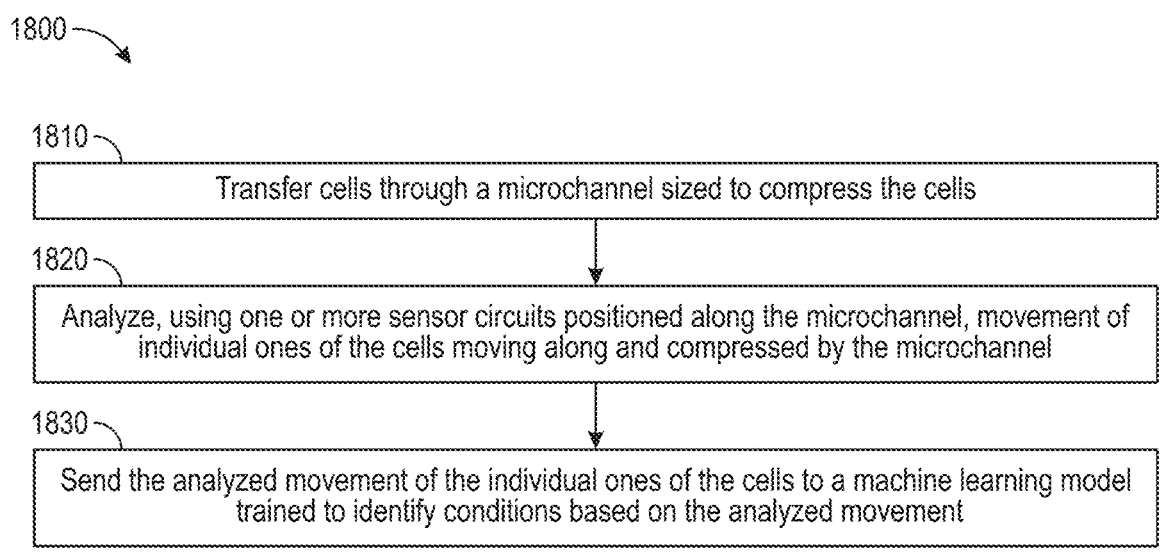
FIG. 18 is a flowchart illustrating a method for analyzing cells in a patient fluid sample in accordance with some embodiments of the present technology.

FIG. 18 is a flowchart illustrating a method 1800 for analyzing cells in a patient fluid sample in accordance with some embodiments of the present technology. The method 1800 can be used to diagnosis or otherwise determine risk of various diseases or conditions. For example, sickled red blood cells can have shapes different from normal red blood cells, so an analysis apparatus can be used to determine ratios or other combinations (e.g., differences, averages, weighted averages, products) of any two or more of the sensor readings discussed above with respect to FIG. 15, and correlate the determine sensor reading ratios (or other combinations) with data to diagnose or otherwise determine risk of sickle cell disease. Other parameters, such as the number of red blood cells counted, can also be considered to evaluate potential diseases. Therefore, the present technology can be used to diagnose, for example, anemia, sickle cell disease, thalassemia, polycythemia vera, G6PD deficiency, autoimmune hemolytic anemia, hereditary spherocytosis, paroxysmal nocturnal hemoglobinuria, hemolytic uremic syndrome, malaria, leukemia, lymphoma, myelodysplastic syndrome, HIV/AIDS, neutropenia, mononucleosis, chronic granulomatous disease, hematologic cancers, autoimmune neutropenia, rheumatoid arthritis, system lupus erythematosus, etc.

The method 1800 can include, at block 1810, transferring cells (e.g., red blood cells, white blood cells, etc.) through a microchannel sized to compress the cells. The method 1800 can include, at block 1820, analyzing, using one or more sensor circuits positioned along the microchannel, movement of individual ones of the cells moving along and compressed by the microchannel. The method 1800 can include, at block 1830, sending the analyzed movement of the individual ones of the cells to a machine learning model trained to identify conditions based on the analyzed movement. In some embodiments, the machine learning model (hereinafter "the ML model") is trained on cell travel data training sets (e.g., fluid sample data of individuals with known diseases or conditions) to identify conditions based on one or more travel parameters. The training data and the input data can be specific sensor reading measurements (e.g., period of a signal, minimum and/or maximum voltage, shape of peaks and troughs, etc.), distributions of ratios or other combinations (e.g., degree of symmetry) of measured sensor readings as discussed above with respect to FIGS. 14A-16C, etc.

A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. A new data item can have parameters that a model can use to assign a classification to the new data item. As another example, a model can be a probability distribution resulting from the analysis of training data, such as a likelihood of a person having or developing a particular condition in a given timeframe based on an analysis of a large corpus of events with corresponding times. Examples of models include: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, a condition identification model can be a neural network with multiple input nodes that receive fluid sample data. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used as an indicator of a potential condition. In some implementations, such neural networks, known as deep neural networks, can have multiple layers of intermediate nodes with different configurations, can be a combination of models that receive different parts of the input and/or input from other parts of the deep neural network, or are convolutions partially using output from previous iterations of applying the model as further input to produce results for the current input.

The condition identification model can be trained with supervised learning, where the training data includes the positive and negative training items as fluid sample data paired with other individual data (e.g., family medical history, demographical information) as input and a desired output, such as presence of a particular condition. Output from the model can be compared to the desired output for that individual and, based on the comparison, the model can be modified, such as by changing weights between nodes of the neural network or parameters of the functions used at each node in the neural network (e.g., applying a loss function). After applying each of the pairings in the training data and modifying the model in this manner, the model can be trained to evaluate new fluid sample data to generate a list of present or potential conditions (and associated probabilities). In some implementations, the present technology can store results of users' fluid sample analysis as further training data and use that data to update the machine learning model.

The condition identification model can be trained with unsupervised learning in which the ML model identifies patterns, relationships, or other unique features within the data. For example, clustering, where the ML model groups similar data points together based on certain features or characteristics, can be used. In another example, dimensionality reduction (e.g., Principal Component Analysis (PCA)), which involves simplifying the dataset by extracting essential features and reducing its complexity, can be used.

Figure 19:
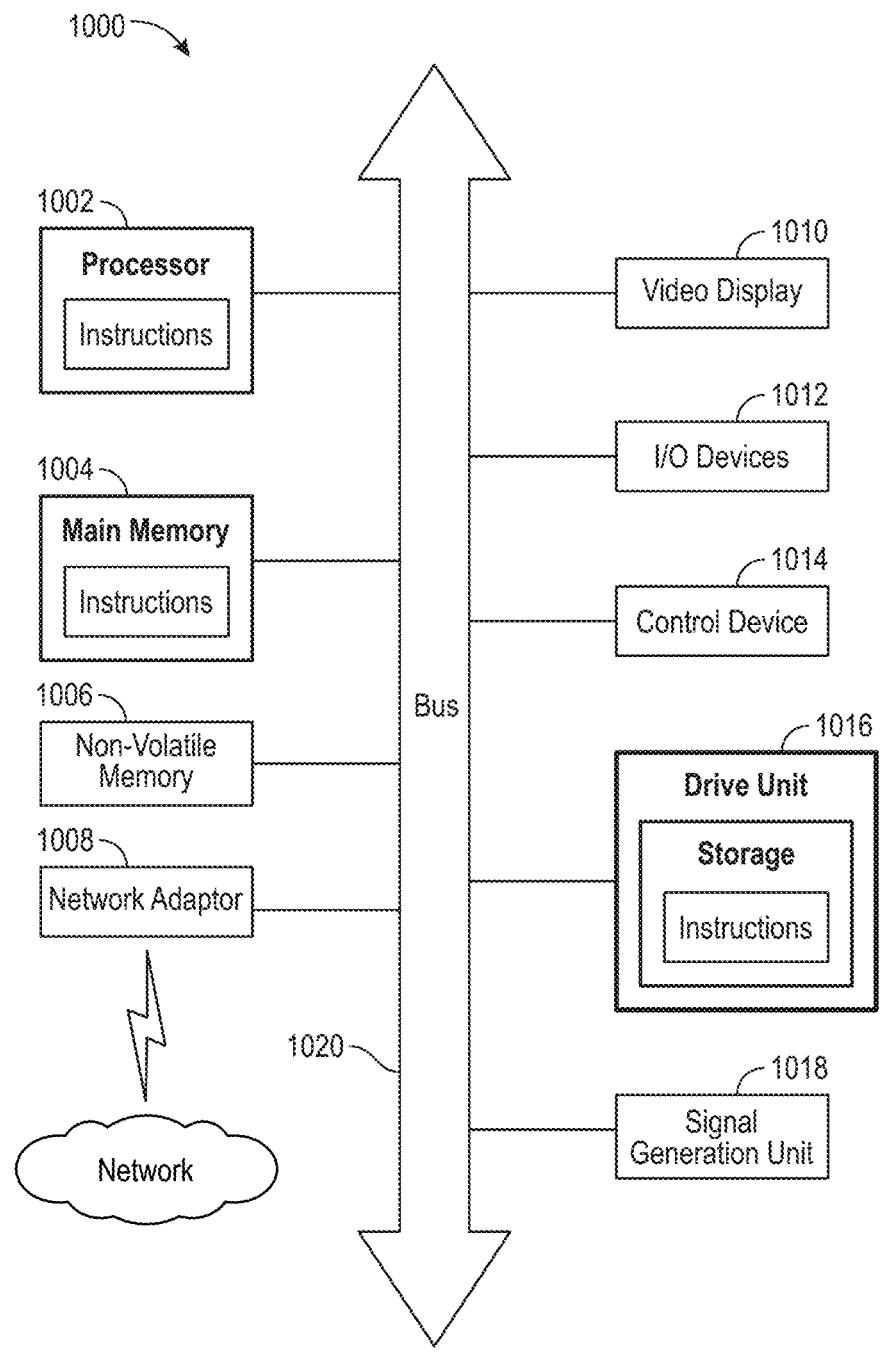
FIG. 19 is a block diagram illustrating an example of a processing system in accordance with some embodiments of the present technology.

FIG. 19 is a block diagram illustrating an example of a processing system 1000 in which at least some operations described herein can be implemented. For example, a computing device (e.g., the analysis apparatus 104, one or more client computing devices 120, or a combination thereof of FIG. 1) may be implemented using the processing system 1000.

The processing system 1000 may include one or more central processing units 1002 ("processors"), main memory 1004, non-volatile memory 1006, network adapters 1008 (e.g., network interfaces), video displays 1010, input/output devices 1012, control devices 1014 (e.g., keyboard and pointing devices), drive units 1016 including a storage medium, and/or signal generation devices 1018 that are communicatively connected to a bus 1020. The bus 1020 is illustrated as an abstraction that represents one or more physical buses and/or point-to-point connections that are connected by appropriate bridges, adapters, or controllers. The bus 1020, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 1000 may operate in the capacity of a server or a client machine in a client-server network environment, or as a peer machine in a peer-to-peer network environment. The processing system 1000 may be an analysis circuit within a medical device, a server, a personal computer, a tablet computer, a personal digital assistant (PDA), a mobile phone, a gaming console, a gaming device, a music player, a wearable electronic device, a network-connected ("smart") device, a virtual/augmented reality system, or any other machine capable of executing a set of instructions (sequential or otherwise) that specify actions to be taken by the processing system 1000.

While the main memory 1004, the non-volatile memory 1006, and the storage medium (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions. The term "machine-readable medium" and "storage medium" shall also be taken to include any medium that is capable of storing, encoding, or carrying a set of instructions for execution by the processing system 1000.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions) set at various times in various memory and storage devices in a computing device. When read and executed by the one or more processors, the instruction(s) cause the processing system to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices, floppy and other removable disks, hard disk drives, optical disks (e.g., Compact Disk Read-Only Memory (CD ROMS), Digital Versatile Disks (DVDs)), and transmission-type media such as digital and analog communication links.

The network adapter 1008 enables the processing system to mediate data in a network with an entity that is external to the processing system through any communication protocol supported by the processing system and the external entity. The network adapter 1008 can include one or more of network adaptor cards, wireless network interface card, router, an access point, wireless router, switch, multilayer switch, protocol converter, gateway, bridge, bridge router, hub, digital media receiver, and/or a repeater.

The network adapter 1008 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

As described above, in some embodiments, the degree of glycation may be measured using changes in the physical characteristics of red blood cells due to the glycation. In some embodiments, systems that use the disclosed technology (e.g., calculating mechanical properties, such as stiffness or hardness, of each individual red blood cell based on their microchannel passage time) may determine the degree of glycation more stably in response to external and human factors compared to equipment using biochemical techniques. In some embodiments, the glycated hemoglobin level measuring system can detect minute electrical changes that occur due to the passage of red blood cells using a circuit configuration and determine the degree of glycation of the red blood cells. In some embodiments, the glycated hemoglobin level measuring system can be used directly for clinical diagnosis by correcting an initial calculation of the glycated hemoglobin level using an individual user's reference value.

The systems can store one or more analyte management programs, calibration routines, or protocols. In some embodiments, the analyte management program can indicate whether a measured analyte level is within a target or healthy range (e.g., HbA1c level of 4%-6% of total hemoglobin). The HbA1c level can indicate the subject-specific effectiveness of blood glucose management over a period of time, such as one or more months preceding the analysis. If the subject has a higher level (e.g., HbA1c level greater than 8% of total hemoglobin), the subject could be diabetic or pre-diabetic. The subject can take steps to lower the HbA1c level to an acceptable target level (e.g., HbA1c level equal to or less than 5%, 6%, or 7% of total hemoglobin). The healthy range and target level can be inputted by the user, healthcare provider, or another source.

Furthermore, the glycated hemoglobin level measuring system can be implemented with a computer-readable storage medium or a similar device using, for example, software, hardware, or a combination thereof. In a hardware implementation, the glycated hemoglobin level measuring system can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some embodiments, the glycated hemoglobin level measuring system may be implemented by a control module itself. In a software implementation, one or more aspects of the glycated hemoglobin level measuring system, such as the procedures and functions described above, may be implemented as separate software modules. Each of the software modules may perform one or more functions and operations described in the present specification. Software code may be implemented in software applications written in a suitable programming language. The software code may be stored in a memory module and may be executed by the control module.

The embodiments, features, systems, devices, materials, methods and techniques described herein may, in some embodiments, be similar to any one or more of the embodiments, features, systems, devices, materials, methods and techniques described in the following:

Korean Patent Application No. 10-2021-0128520, filed Sep. 29, 2021, issued as Korean Patent No. 10-2439474;

International Application PCT/KR2021/018280, filed Dec. 3, 2021;

U.S. application Ser. No. 18/064,233 titled APPARATUS FOR MEASURING GLYCATION OF RED BLOOD CELLS AND GLYCATED HEMOGLOBIN LEVEL USING PHYSICAL AND ELECTRICAL CHARACTERISTICS OF CELLS, AND RELATED METHODS, filed on Dec. 9, 2022, and listing inventors: Ung-Hyeon Ko; Seung-Jin Kang; and Eun-Young Park;

International Application PCT/KR2022/019905, filed Dec. 8, 2022;

Korean Patent Application No. 10-2022-0031378, filed Mar. 14, 2022; and

U.S. application Ser. No. 18/064,238 titled APPARATUS FOR MEASURING PROPERTIES OF PARTICLES IN A SOLUTION AND RELATED METHODS, filed on Dec. 9, 2022, and listing inventors: Ung-Hyeon Ko; Seung-Jin Kang; and Eun-Young Park.

All of the above-identified patents and applications are incorporated by reference in their entireties. In addition, the embodiments, features, systems, devices, materials, methods and techniques described herein may, in certain embodiments, be applied to or used in connection with any one or more of the embodiments, features, systems, devices, or other matter.

The above description is merely illustrative of the technical idea of the present disclosure, and various modifications, changes, and substitutions may be made by those skilled in the art without departing from the essential features of the present disclosure. Accordingly, the embodiments described above and in the accompanying drawings are intended to describe the present technology without limiting the associated technical ideas. The scope of the present technology is not limited by any of the embodiments described above and the accompanying drawings.

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. A method for analyzing red blood cells in a patient blood sample, the method comprising:
    transferring red blood cells through a microchannel sized to compress the red blood cells;
    analyzing, using one or more sensor circuits positioned along the microchannel, movement of individual ones of the red blood cells moving along and compressed by the microchannel;
    determining, for individual ones of the red blood cells, a ratio between a first travel parameter and a second travel parameter based on the analyzed movement of the red blood cells; and determining an analyte characteristic of the red blood cells based on the determined ratios.
2. The method of any one of the clauses herein, wherein the first travel parameter comprises a first velocity of the red blood cell at a first region of the microchannel, wherein the second travel parameter comprises a second velocity of the red blood cell at a second region of the microchannel.
3. The method of any one of the clauses herein, wherein the first travel parameter comprises a velocity of the red blood cell at a region of the microchannel, wherein the second travel parameter comprises an average velocity of the red blood cell along the microchannel.
4. The method of any one of the clauses herein, wherein analyzing the movement of individual ones of the red blood cells comprises obtaining a voltage signal, wherein the first travel parameter comprises a width of a peak of the voltage signal, and wherein the second travel parameter comprises a width of a trough of the voltage signal.
5. The method of any one of the clauses herein, wherein the ratio between the first travel parameter and the second travel parameter indicates a degree of symmetry of a shape of the red blood cell.
6. The method of any one of the clauses herein, further comprising:
    determining a distribution of the determined ratios for the red blood cells, wherein determining the analyte characteristic of the red blood cells is further determined based on the distribution.
7. The method of any one of the clauses herein, wherein the determined distribution includes the determined ratios for at least 150 red blood cells.
8. The method of any one of the clauses herein, wherein the analyte characteristic indicates a glycated hemoglobin level of the one or more red blood cells.
9. The method of any one of the clauses herein, wherein transferring the red blood cells comprises passively transferring the red blood cells through the microchannel via capillary action.
10. The method of any one of the clauses herein, wherein transferring the red blood cells comprises passively transferring the red blood cells through the microchannel via evaporation at an outlet of the microchannel.
11. A cartridge for analyzing red blood cells in a patient blood sample, the cartridge comprising:
    a cartridge body including a blood cell compression microchannel; and
    a blood cell analyzer coupled to the cartridge body and positioned to analyze individual red blood cells compressed by and moving along the blood cell compression microchannel, wherein the blood cell analyzer is configured to output signals indicative of one or more travel parameters of the compressed red blood cells at multiple locations along the blood cell compression microchannel to determine an analyte characteristic of the red blood cells.
12. The cartridge of any one of the clauses herein, wherein the blood cell compression channel is configured to interact with the individual blood cells to produce, for each blood cell, a first travel parameter and a second travel parameter sufficiently different from the first travel parameter for determining a travel parameter ratio for the corresponding blood cell.
13. The cartridge of any one of the clauses herein, wherein the compression channel has an inlet portion, an outlet portion, and an observation window extending between the inlet portion and the outlet portion, wherein a first portion of the observation window proximate the inlet portion is configured to allow red blood cells to flow in an uncompressed state, and wherein a second portion of the observation proximate the outlet portion is configured to allow red blood cells to flow in a compressed state.
14. A system for analyzing red blood cells in a patient blood sample, the system comprising:
    a cartridge including:
        cartridge body including a blood cell compression microchannel sized to compress red blood cells;

a blood cell analyzer positioned to analyze individual compressed red blood cells positioned in the blood cell compression microchannel; and an analysis apparatus configured to be operative coupled to the cartridge to communicate with the blood cell analyzer, wherein the analysis apparatus is programmed to cause the blood cell analyzer to analyze the compressed red blood cells to determine travel parameters associated with corresponding compressed red blood cells at multiple locations along the blood cell compression microchannel.

15. The system of any one of the clauses herein, wherein the analysis apparatus is programmed to determining an analyte characteristic of the red blood cells based on comparison of the travel parameters.

16. The system of any one of the clauses herein, wherein the compression channel is configured to interact with the individual blood cells to produce for each blood cell a first travel parameter and a second travel parameter sufficiently different from the first travel parameter for determining a travel parameter ratio, wherein the analysis apparatus includes one or more sensor circuits operable to measure signals for the corresponding red blood cells for determining the travel parameter ratio for the corresponding red blood cells.

17. A method for analyzing cells in a patient fluid sample, the method comprising:
transferring cells through a microchannel sized to compress the cells;
analyzing, using one or more sensor circuits positioned along the microchannel, movement of individual ones of the cells moving along and compressed by the microchannel; and
sending the analyzed movement of the individual ones of the cells to a machine learning model trained to identify conditions based on the analyzed movement, wherein the machine learning model is trained on cell travel data training sets to identify conditions based on one or more travel parameters.

18. The method of any one of the clauses herein, wherein the analyzed movement comprises a wavelength of a signal received by the one or more sensor circuits.

19. The method of any one of the clauses herein, wherein the analyzed movement comprises an amplitude of a signal received by the one or more sensor circuits.

20. The method of any one of the clauses herein, wherein the analyzed movement comprises a degree of symmetry of a signal received by the one or more sensor circuits.

21. The method of any one of the clauses herein, wherein the analyzed movement comprises a count of the cells during a predetermined measurement period.

22. The method of any one of the clauses herein, wherein the machine learning model is trained to identify conditions including at least one of anemia, sickle cell disease, thalassemia, polycythemia vera, G6PD deficiency, autoimmune hemolytic anemia, hereditary spherocytosis, paroxysmal nocturnal hemoglobinuria, hemolytic uremic syndrome, malaria, leukemia, lymphoma, myelodysplastic syndrome, HIV/AIDS, neutropenia, mononucleosis, chronic granulomatous disease, hematologic cancers, autoimmune neutropenia, rheumatoid arthritis, or system lupus erythematosus.

23. A computer readable medium including processor instructions that, when executed by one or more processors, causes the one or more processors to:

receive a set of sensor outputs representative of movement of each red blood cell through a microchannel that is sized to compress the red blood cell;
determining, for each red blood cell, a comparison measure between the set of sensor outputs based on the analyzed movement of the red blood cells; and
determining an analyte characteristic of the red blood cells based on the comparison measure.

24 The non-transitory computer readable medium of any one of the clauses herein, wherein:
the receive set of sensor outputs include at least (1) a first travel parameter representative of the corresponding red blood cell moving through a first sensing region in the microchannel and (2) a second travel parameter representative of the corresponding red blood cell moving through a second sensing region in the microchannel; and
the comparison measure represents to a change in the movement of each red blood cell between the first and second sensing regions.

25. The non-transitory computer readable medium of any one of the clauses herein, wherein:
the first travel parameter represents a first speed for the corresponding red blood cell traversing across the first sensing zone;
the second travel parameter represents a second speed for the corresponding red blood cell traversing across the second sensing zone;
the comparison measure includes a ratio between the first and second travel parameters; and
the analyte characteristic indicates a glycated hemoglobin level representative of stiffness of the one or more red blood cells.

26. The non-transitory computer readable medium of any one of the clauses herein, wherein:
the set of sensor outputs include a difference between (1) an initial signal from an initial electrode located before a reference electrode along the microchannel and (2) a subsequent signal from a subsequent electrode located after the reference electrode,
wherein the initial signal and the subsequent signal are each a reference signal or a derivation thereof communicated from the reference electrode and received across a corresponding portion of the microchannel,
wherein the difference represents level changes corresponding to a voltage change and/or a phase change in the reference signal as caused by a proximity or an overlap between the corresponding red blood cell and the reference electrode, the initial electrode, and the subsequent electrode,
wherein the difference includes (1) an initial change above or below an initial state and representative of the corresponding red blood cell traveling across the initial electrode partially overlapping with the reference electrode, (2) a midway point matching the initial state, and then (3) a subsequent change opposite in polarity or direction from the initial change and representative of the corresponding red blood cell traveling through the reference electrode and past the subsequent electrode;
the comparison measure represents a comparison between the initial change and the subsequent change in magnitude, shape, width, or a combination thereof; and the analyte characteristic represents a glycated hemoglobin level, an estimated blood disease, or a combination thereof according to the comparison measure for the red blood cells.

We claim:

1. A method for analyzing red blood cells in a patient blood sample, the method comprising:
transferring, via capillary action, red blood cells through a microchannel sized to compress the red blood cells, wherein the microchannel includes (i) a first region having a first cross-sectional dimension and (ii) a second region downstream of the first region and having a second cross-sectional dimension less than the first cross-sectional dimension;
analyzing, using one or more sensor circuits positioned along the microchannel, movement of individual ones of the red blood cells moving along the microchannel;
determining a plurality of ratios based on the analyzed movement of the individual ones of the red blood cells, wherein each of the ratios is between a first speed of a respective one of the red blood cells at the first region of the microchannel and a second speed of the respective one of the red blood cells at the second region of the microchannel, and wherein the second speed is different from the first speed; and
determining an analyte characteristic of the red blood cells based on the determined plurality of ratios.

2. The method of claim 1, wherein the analyzing the movement of individual ones of the red blood cells comprises obtaining a voltage signal, wherein the first speed corresponds to a width of a peak of the voltage signal, and wherein the second speed corresponds to a width of a trough of the voltage signal.

3. The method of claim 1, wherein the determining the analytic characteristic comprises determining one or more degrees of symmetry of shapes of the red blood cells.

4. The method of claim 1, further comprising:
determining a distribution of the determined ratios for the red blood cells, wherein determining the analyte characteristic of the red blood cells is further determined based on the distribution.

5. The method of claim 1, wherein the transferring the red blood cells comprises evaporating the red blood cells via an outlet of the microchannel.

6. The method of claim 1, wherein determining the analyte characteristic comprises determining a glycated hemoglobin level of the red blood cells based on the determined ratios.

7. The method of claim 1, wherein determining the analyte characteristic comprises determining an HbA1c percentage of the red blood cells based on the determined ratios.

8. The method of claim 1, wherein determining the analyte characteristic comprises determining a blood disease associated with the red blood cells based on the determined ratios.

9. The method of claim 1, further comprising:
measuring the first speed using a first set of sensors at the first region of the microchannel; and
measuring the second speed using a second set of sensors at the second region of the microchannel, wherein the second region is spaced apart from the first region.

10. The method of claim 9, wherein determining the analyte characteristic comprises determining a glycated hemoglobin level of the red blood cells, and wherein the glycated hemoglobin level is inversely correlated with the determined ratios.

11. The method of claim 1, wherein:
determining the plurality of ratios comprises removing or at least partially canceling out one or more variability factors such that each of the determined ratios primarily represents a rigidity of the respective one of the red blood cells, and
determining the analyte characteristic comprises:
determining a distribution of the determined ratios for the red blood cells;
comparing the determined distribution to a plurality of distribution graphs, wherein each distribution graph (i) corresponds to a unique value of the analyte characteristic and (ii) plots a plurality of ratios corresponding to a plurality of red blood cells; and
identifying one of the plurality of distribution graphs that substantially matches the determined distribution.

* * * * *